(12) United States Patent
Tao et al.

(10) Patent No.: US 11,451,994 B2
(45) Date of Patent: Sep. 20, 2022

(54) USER EQUIPMENT INVOLVED IN PERFORMING MEASUREMENTS

(71) Applicant: Panasonic Intellectual Property Corporation of America, Torrance, CA (US)

(72) Inventors: Ming-Hung Tao, Frankfurt am Main (DE); Hidetoshi Suzuki, Kanagawa (JP); Rikin Shah, Langen (DE); Quan Kuang, Langen (DE)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 50 days.

(21) Appl. No.: 17/098,003

(22) Filed: Nov. 13, 2020

(65) Prior Publication Data

US 2021/0068000 A1 Mar. 4, 2021

Related U.S. Application Data

(63) Continuation of application No. PCT/EP2019/075920, filed on Sep. 25, 2019.

(30) Foreign Application Priority Data

Oct. 30, 2018 (EP) .................................. 18203524

(51) Int. Cl.
*H04W 24/10* (2009.01)
*H04B 17/318* (2015.01)
(Continued)

(52) U.S. Cl.
CPC .......... *H04W 24/10* (2013.01); *H04B 7/0626* (2013.01); *H04B 17/318* (2015.01); *H04L 5/005* (2013.01); *H04W 56/001* (2013.01)

(58) Field of Classification Search
CPC .. H04W 24/10; H04W 56/001; H04B 17/318; H04B 7/0626; H04L 5/005
See application file for complete search history.

(56) References Cited

U.S. PATENT DOCUMENTS

2016/0128100 A1* 5/2016 Yi ....................... H04L 27/0006
370/329
2017/0150382 A1 5/2017 Martin et al.
(Continued)

FOREIGN PATENT DOCUMENTS

| EP | 3972328 A1 * | 3/2022 | ........... H04L 1/0026 |
| WO | WO-2013170414 A1 * | 11/2013 | ........ H04W 36/0083 |
| WO | WO-2018068808 A1 * | 4/2018 | ........... H04L 5/0051 |

OTHER PUBLICATIONS

3GPP TR 36.889 V13.0.0, "$3^{rd}$ Generation Partnership Project; Technical Specification Group Radio Access Network; Study on Licensed-Assisted Access to Unlicensed Spectrum; (Release 13)," Jun. 2015, 87 pages.

(Continued)

*Primary Examiner* — Deepa Belur
(74) *Attorney, Agent, or Firm* — Seed IP Law Group LLP

(57) ABSTRACT

The present disclosure relates to a user equipment (UE) comprises a receiver that receives a plurality of reference signals. Processing circuitry of the UE performs power-related measurements on the plurality of reference signals. The processing circuitry determines the availability of reference signals among the plurality of reference signals for the power-related measurements. The processing circuitry generates measurement results based on the performed power-related measurements and depending on the determined availability of the reference signals.

14 Claims, 9 Drawing Sheets

(51) Int. Cl.
*H04B 7/06* (2006.01)
*H04L 5/00* (2006.01)
*H04W 56/00* (2009.01)

(56) References Cited

U.S. PATENT DOCUMENTS

2017/0265095 A1   9/2017   Harada et al.
2018/0242183 A1*  8/2018   Bergström ............. H04L 5/001
2019/0116549 A1*  4/2019   Huang ................. H04W 16/14

OTHER PUBLICATIONS

3GPP TR 38.801 V14.0.0, "3rd Generation Partnership Project; Technical Specification Group Radio Access Network; Study on new radio access technology; Radio access architecture and interfaces (Release 14)," Mar. 2017, 91 pages.
3GPP TR 38.804 V14.0.0, "3rd Generation Partnership Project; Technical Specification Group Radio Access Network; Study on New Radio Access Technology; Radio Interface Protocol Aspects (Release 14)," Mar. 2017, 57 pages.
3GPP TR 38.913 V15.0.0, "3rd Generation Partnership Project; Technical Specification Group Radio Access Network; Study on Scenarios and Requirements for Next Generation Access Technologies; (Release 15)," Jun. 2018, 39 pages.
3GPP TS 38.133 V15.3.0, "3rd Generation Partnership Project; Technical Specification Group Radio Access Network; NR; Requirements for support of radio resource management (Release 15)," Sep. 2018, 136 pages.
3GPP TS 38.211 V15.2.0, "3rd Generation Partnership Project; Technical Specification Group Radio Access Network; NR; Physical channels and modulation (Release 15)," Jun. 2018, 96 pages.
3GPP TS 38.211 V15.3.0, "3rd Generation Partnership Project; Technical Specification Group Radio Access Network; NR; Physical channels and modulation (Release 15)," Sep. 2018, 96 pages.
3GPP TS 38.215 V15.3.0, "3rd Generation Partnership Project; Technical Specification Group Radio Access Network; NR; Physical layer measurements (Release 15)," Sep. 2018, 15 pages.
3GPP TS 38.300 V15.2.0, "3rd Generation Partnership Project; Technical Specification Group Radio Access Network; NR; NR and NG-RAN Overall Description; Stage 2 (Release 15)," Jun. 2018, 87 pages.
3GPP TS 38.300 V15.3.1, "3rd Generation Partnership Project; Technical Specification Group Radio Access Network; NR; NR and NG-RAN Overall Description; Stage 2 (Release 15)," Oct. 2018, 92 pages.
3GPP TS 38.331 V15.3.0, "3rd Generation Partnership Project; Technical Specification Group Radio Access Network; NR; Radio Resource Control (RRC) protocol specification (Release 15)," Sep. 2018, 445 pages.
Alcatel-Lucent Shanghai Bell, Alcatel-Lucent, "Remaining Details of RRM Measurement for LAA," Rl-157015, Agenda Item: 6.2.3.2, 3GPP TSG RAN WG1 Meeting #83, Anaheim, USA, Nov. 15-22, 2015, 4 pages.
ETSI, "Broadband Radio Access Networks (BRAN); 5 GHz high performance RLAN; Harmonized EN covering the essential requirements of article 3.2 of the R&TTE Directive," ETSI EN 301 893 V1.8,1, Mar. 2015, 93 pages.
Extended European Search Report, dated Jul. 15, 2019, for European Application No. 18203524.6, 25 pages.
InterDigital Inc., "RRM for NR-U," R2-1814013, Agenda Item: 11.2.2.2, 3GPP TSG-RAN WG2 Meeting #103bis, Chengdu, China, Oct. 8-12, 2018, 4 pages.
International Search Report, dated Jan. 29, 2020, for International Application No. PCT/EP2019/075920, 8 pages.
LG Electronics Inc., "Channel occupancy measurement enhancements for NR-U," R2-18XXXX (R2-1815397), Agenda item: 11.2.2.2, 3GPP TSG-RAN WG2 Meeting #103bis, Chengdu, China, Oct. 8-12, 2018, 2 pages.

* cited by examiner

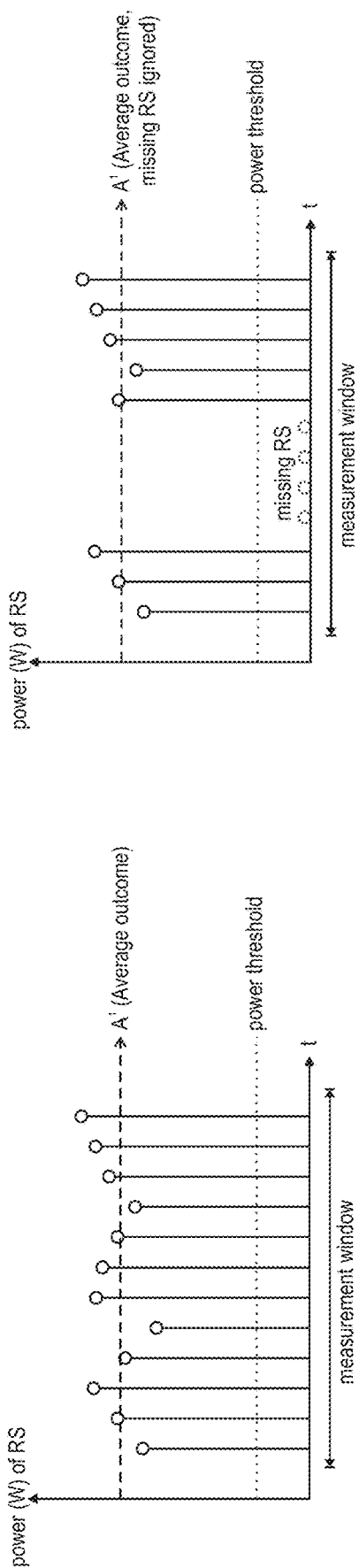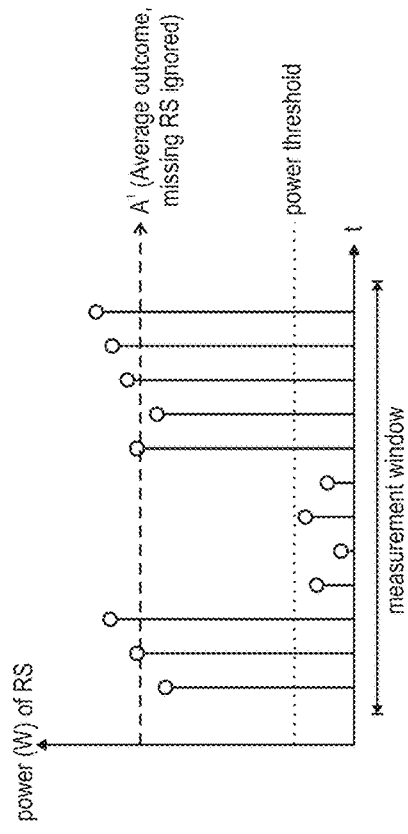
Fig. 6
Fig. 7
Fig. 8

USER EQUIPMENT INVOLVED IN PERFORMING MEASUREMENTS

BACKGROUND

Technical Field

The present disclosure is directed to methods, devices and articles in communication systems, such as 3GPP communication systems.

Description of the Related Art

Currently, the 3rd Generation Partnership Project (3GPP) works at the technical specifications for the next generation cellular technology, which is also called fifth generation (5G).

One objective is to provide a single technical framework addressing all usage scenarios, requirements and deployment scenarios (see, e.g., section 6 of TR 38.913 version 15.0.0 incorporated herein by reference), at least including enhanced mobile broadband (eMBB), ultra-reliable low-latency communications (URLLC), massive machine type communication (mMTC). For example, eMBB deployment scenarios may include indoor hotspot, dense urban, rural, urban macro and high speed; URLLC deployment scenarios may include industrial control systems, mobile health care (remote monitoring, diagnosis and treatment), real time control of vehicles, wide area monitoring and control systems for smart grids; mMTC deployment scenarios may include scenarios with large number of devices with non-time critical data transfers such as smart wearables and sensor networks. The services eMBB and URLLC are similar in that they both demand a very broad bandwidth, however are different in that the URLLC service may preferably require ultra-low latencies.

A second objective is to achieve forward compatibility. Backward compatibility to Long Term Evolution (LTE, LTE-A) cellular systems is not required, which facilitates a completely new system design and/or the introduction of novel features.

BRIEF SUMMARY

Non-limiting and exemplary embodiments facilitate providing improved procedures for performing power-related measurements.

In one general first example, the techniques disclosed here feature a user equipment comprising a receiver, which receives a plurality of reference signals. A processing circuitry of the UE performs power-related measurements on the plurality of reference signals. The processing circuitry determines the availability of reference signals among the plurality of reference signals for the power-related measurements. The processing circuitry generates measurement results based on the performed power-related measurements and depending on the determined availability of the reference signals.

In one general first example, the techniques disclosed here feature a base station comprising a transmitter, which transmits a plurality of reference signals in a radio cell controlled by the base station. A receiver of the base station receives measurement results from a user equipment, UE, based on power-related measurement performed by the user equipment on the reference signals. The measurement results include measurement values reflecting the power of the reference signals during a measurement time period, and the measurement results include a measurement accuracy parameter reflecting the measurement accuracy of the power-related measurements. Processing circuitry of the base station determines whether to handover the user equipment from the radio cell to another radio cell, based on the received measurement values and measurement accuracy parameter of the measurement results.

In one general first example, the techniques disclosed here feature a method comprising the following steps performed by a user equipment. The UE receives a plurality of reference signals and performs power-related measurements on the plurality of reference signals. The UE determines the availability of reference signals among the plurality of reference signals for the power-related measurements. The UE generates measurement results based on the performed power-related measurements and depending on the determined availability of the reference signals.

It should be noted that general or specific embodiments may be implemented as a system, a method, an integrated circuit, a computer program, a storage medium, or any selective combination thereof.

Additional benefits and advantages of the disclosed embodiments and different implementations will be apparent from the specification and figures. The benefits and/or advantages may be individually obtained by the various embodiments and features of the specification and drawings, which need not all be provided in order to obtain one or more of such benefits and/or advantages.

BRIEF DESCRIPTION OF THE SEVERAL VIEWS OF THE DRAWINGS

In the following exemplary embodiments are described in more detail with reference to the attached figures and drawings.

FIGS. 6, 7, 8 illustrate the presence or absence of reference signals during a measurement period for the UE measurements

DETAILED DESCRIPTION

5G NR System Architecture and Protocol Stacks

3GPP is working at the next release for the 5$^{th}$ generation cellular technology, simply called 5G, including the development of a new radio access technology (NR) operating in frequencies ranging up to 100 GHz. 3GPP has to identify and develop the technology components needed for successfully standardizing the NR system timely satisfying both the urgent market needs and the more long-term requirements. In order to achieve this, evolutions of the radio interface as well as radio network architecture are considered in the study item "New Radio Access Technology." Results and agreements are collected in the Technical Report TR 38.804 v14.0.0, incorporated herein in its entirety by reference.

Figure 1:
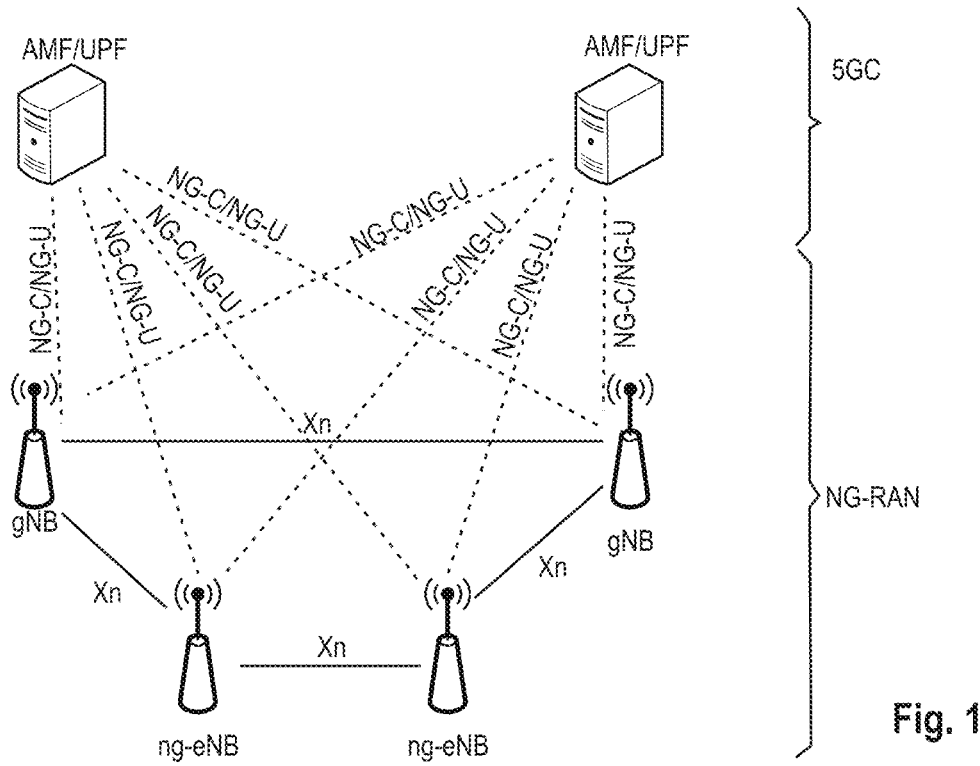
FIG. 1 shows an exemplary architecture for a 3GPP NR system.

Among other things, the overall system architecture assumes an NG-RAN (Next Generation-Radio Access Network) that comprises gNBs, providing the NG-radio access user plane (SDAP/PDCP/RLC/MAC/PHY) and control plane (RRC) protocol terminations towards the UE. The gNBs are interconnected with each other by means of the Xn interface. The gNBs are also connected by means of the Next Generation (NG) interface to the NGC (Next Generation Core), more specifically to the AMF (Access and Mobility Management Function) (e.g., a particular core entity performing the AMF) by means of the NG-C interface and to the UPF (User Plane Function) (e.g., a particular core entity performing the UPF) by means of the NG-U interface. The NG-RAN architecture is illustrated in FIG. 1 (see, e.g., 3GPP TS 38.300 v15.2.0, section 4 incorporated herein by reference).

Figure 2:
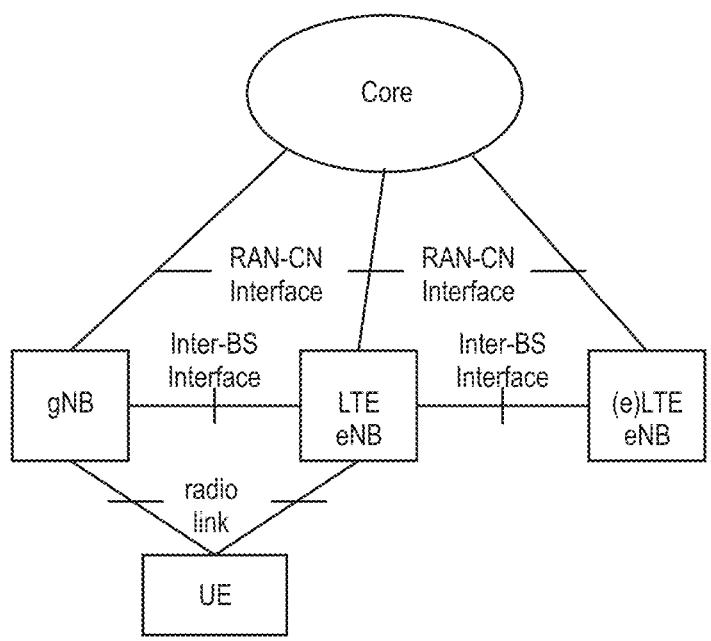
FIG. 2 shows an exemplary user and control plane architecture for the LTE eNB, gNB, and UE.

Various different deployment scenarios can be supported (see, e.g., 3GPP TR 38.801 v14.0.0 incorporated herein by reference). For instance, a non-centralized deployment scenario (see, e.g., section 5.2 of TR 38.801; a centralized deployment is illustrated in section 5.4) is presented therein, where base stations supporting the 5G NR can be deployed. FIG. 2 illustrates an exemplary non-centralized deployment scenario (see, e.g., FIG. 5.2.-1 of said TR 38.801), while additionally illustrating an LTE eNB as well as a user equipment (UE) that is connected to both a gNB and an LTE eNB. The new eNB for NR 5G may be exemplarily called gNB. An eLTE eNB is the evolution of an eNB that supports connectivity to the EPC (Evolved Packet Core) and the NGC (Next Generation Core).

The user plane protocol stack for NR (see, e.g., 3GPP TS 38.300 v15.2.0, section 4.4.1 incorporated herein by reference) comprises the PDCP (Packet Data Convergence Protocol, see section 6.4 of TS 38.300), RLC (Radio Link Control, see section 6.3 of TS 38.300) and MAC (Medium Access Control, see section 6.2 of TS 38.300) sublayers, which are terminated in the gNB on the network side. Additionally, a new access stratum (AS) sublayer (SDAP, Service Data Adaptation Protocol) is introduced above PDCP (see, e.g., sub-clause 6.5 of 3GPP TS 38.300 version 15.2.0 incorporated herein by reference). A control plane protocol stack is also defined for NR (see for instance TS 38.300, section 4.4.2). An overview of the Layer 2 functions is given in sub-clause 6 of TS 38.300. The functions of the PDCP, RLC and MAC sublayers are listed respectively in sections 6.4, 6.3, and 6.2 of TS 38.300. The functions of the RRC layer are listed in sub-clause 7 of TS 38.300. The mentioned sections of TS 38.300 are incorporated herein by reference.

Use cases/deployment scenarios for NR could include enhanced mobile broadband (eMBB), ultra-reliable low-latency communications (URLLC), massive machine type communication (mMTC), which have diverse requirements in terms of data rates, latency, and coverage. For example, eMBB is expected to support peak data rates (20 Gbps for downlink and 10 Gbps for uplink) and user-experienced data rates in the order of three times what is offered by IMT-Advanced. On the other hand, in case of URLLC, the tighter requirements are put on ultra-low latency (0.5 ms for UL and DL each for user plane latency) and high reliability (1-10$^{-5}$ within 1 ms). Finally, mMTC may preferably require high connection density (1,000,000 devices/km$^2$ in an urban environment), large coverage in harsh environments, and extremely long-life battery for low cost devices (15 years).

Therefore, the OFDM numerology (e.g., subcarrier spacing, OFDM symbol duration, cyclic prefix (CP) duration, number of symbols per scheduling interval) that is suitable for one use case might not work well for another. For example, low-latency services may preferably require a shorter symbol duration (and thus larger subcarrier spacing) and/or fewer symbols per scheduling interval (aka, TTI) than an mMTC service. Furthermore, deployment scenarios with large channel delay spreads may preferably require a longer CP duration than scenarios with short delay spreads. The subcarrier spacing should be optimized accordingly to retain the similar CP overhead. NR may support more than one value of subcarrier spacing. Correspondingly, subcarrier spacing of 15 kHz, 30 kHz, 60 kHz . . . are being considered at the moment. The symbol duration $T_u$ and the subcarrier spacing $\Delta f$ are directly related through the formula $\Delta f=1/T_u$. In a similar manner as in LTE systems, the term "resource element" can be used to denote a minimum resource unit being composed of one subcarrier for the length of one OFDM/SC-FDMA symbol.

In the new radio system 5G-NR for each numerology and carrier a resource grid of subcarriers and OFDM symbols is defined respectively for uplink and downlink. Each element in the resource grid is called a resource element and is identified based on the frequency index in the frequency domain and the symbol position in the time domain. (see 3GPP TS 38.211 v15.2.0 incorporated herein by reference).

Synchronization Signal Block Measurement Timing Configuration—SMTC—PSS/SSS, PBCH NR has introduced the so-called synchronization signal block, SS block (SSB), which comprises a Primary Synchronization Signal (PSS), a Secondary Synchronization Signal (SSS), and a Physical Broadcast CHannel (PBCH). The PSS and SSS can be used by UEs to find, synchronize to and identify a network. The PBCH carries a minimum amount of system information including an indication where the remaining broadcast system information is transmitted.

In LTE, these three signals were also used, the PSS, SSS, and PBCH, although not as being part of one SSB. The three SSB components are always transmitted together in NR, e.g., they have the same periodicity. A given SSB may be repeated within an SS burst set, which can be potentially used for a gNB beam-sweeping transmission. The SS burst set may be confined to a particular time period, such as a 5 ms window. For initial cell selection, the UE may assume a default SS burst set periodicity of 20 ms.

The 5G NR PSS is Physical Layer specific signal to identify the radio frame boundary and is type of an m-sequence. The 5G NR SSS is also a Physical-Layer specific signal to identify the subframe boundary and is also an m-sequence. (see, e.g., TS 38.211 v15.2.0 section 7.4.2 incorporated herein by reference).

Reference Signals

As in LTE, several different types of reference signals (RS) are used for 5G NR (see 3GPP TS 38.211 v15.3.0 section 7.4.1 incorporated herein by reference). At least the following reference signals are available in 5G NR:
- CSI-RS, Channel State Information Reference Signal, usable for channel state information acquisition and beam management
- PDSCH DMRS, DeModulation Reference Signal, usable for the PDSCH demodulation
- PDCCH DMRS, DeModulation Reference Signal, usable for the PDCCH demodulation
- PBCH DMRS, DeModulation Reference Signal, usable for the PBCH demodulation
- PTRS, Phase Tracking Reference Signal, usable for phase tracking the PDSCH,
- Tracking Reference Signal, usable for time tracking Further, PBCH DMRS can be exemplarily seen as part of the SSB-reference signals (see 3GPP TS 38.215 v15.3.0 section 5.1.1 "SS reference signal received power (SS-RSRP)").

The main differences between reference signals in 5G NR communication systems and reference signals in LTE are that in 5G NR, there is no Cell-specific reference signal, that a new reference signal PTRS has been introduced for time/phase tracking, that DMRS has been introduced for both downlink and uplink channels, and that in NR, the reference signals are transmitted only when it is necessary.

As a DL-only signal, the CSI-RS, which the UE receives, is used to estimate the channel and report channel quality information back to the gNB. During MIMO operations, NR may use different antenna approaches based on the carrier frequency. At lower frequencies, the system uses a modest number of active antennas for MU-MIMO and adds FDD operations. In this case, the UE may use the CSI-RS to calculate the CSI and report it back in the UL direction. The CSI-RS can be further characterized according to the following:
- It is used for DL CSI acquisition.
- Used for RSRP measurements during mobility and beam management
- Also used for frequency/time tracking, demodulation and UL reciprocity based pre-coding
- CSI-RS is configured specific to UE, but multiple users can also share the same resource
- 5G NR standard allows high level of flexibility in CSI-RS configurations, a resource can be configured with up to 32 ports.
- CSI-RS resource may start at any OFDM symbol of the slot and it usually occupies 1/2/4 OFDM symbols depending upon configured number of ports.
- CSI-RS can be periodic, semi-persistent or aperiodic (due to DCI triggering)
- For time/frequency tracking, CSI-RS can either be periodic or aperiodic. It is transmitted in bursts of two or four symbols which are spread across one or two slots UE Measurements in 5G NR An NR device can be configured to carry out different measurements, in some cases followed by a corresponding reporting of the results to the network.

In brief to provide the basic outline of measurements, the UE (NR device) can perform measurements based on reference signals (such as CSI-RS, SS Blocks) and obtains measurement results therefrom. These can be used by the UE internally or by other entities, such as the base station for mobility control, after having received some or all measurement results in a corresponding measurement report.

An exemplary and detailed implementation is presented in the following.

Measurements can be performed by a UE for connected-mode mobility and can be classified in at least three measurement types:
- Intra-frequency NR measurements,
- Inter-frequency NR measurements
- Inter-RAT measurements for E-UTRA In general, the measurements can be configured by e.g., defining one or more measurement objects; a measurement object defines e.g., the carrier frequency to be monitored. Then, for each measurement object one or several reporting configurations can be defined, including reporting criteria such as event-triggered reporting, periodic reporting and event-triggered periodic reporting (see 3GPP TS 38.300 v15.3.1. section 9.1 incorporated herein by reference).

A report configuration indicates the quantity or set of quantities, for instance, different combinations of a channel quality indicator (CQI), a rank indicator (RI), a precoder-matrix indicator (PMI), jointly referred to as channel state information (CSI). Moreover, the report configuration may indicate reporting of received signal strength, more formally referred to as a reference signal received power (RSRP). RSRP has historically been a key quantity to measure and report as part of the higher-layer radio-resource management (RRM), and it is also for 5G NR. NR supports layer-1 reporting of RSRP, for instance, as part of the support for beam management, to thereby derive the beam quality. What is then reported can more specifically be referred to as L1-RSRP, reflecting the fact that the reporting does not include the more long-term ("layer 3") filtering applied for the higher-layer RSRP reporting. The L3-Filtering at RRC level may derive the cell quality from multiple beams, and may thus neutralizes the sudden change by considering the current input from the L1 filter and also the previous output from the L3 filter.

The set of downlink resources on which measurements should be carried out is also configured. For instance, for L1-RSRP for beam management can thus be based on measurements on either a set of SS (synchronization signal) blocks or a set of CSI-RS.

There are also situations when a device carries out measurements without any corresponding reporting to the network. One such exemplary case is when a UE carries out measurements for a receiver side downlink beamforming. The UE internally uses the measurements to select a suitable receiver beam. The network can configure the UEs accordingly by for instance specifying the reference signals to measure on, however indicating that no reporting is required.

Figure 3:
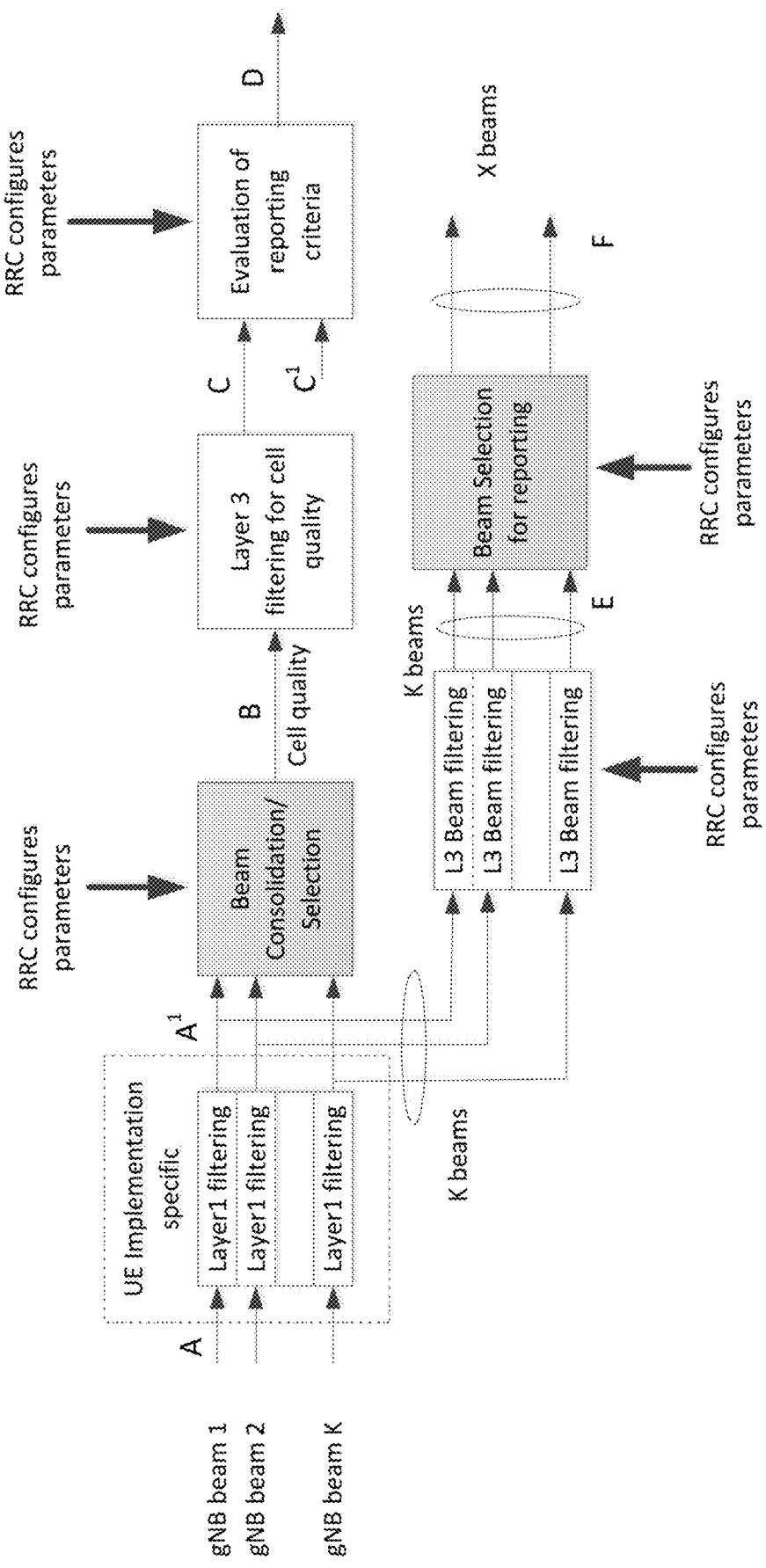
FIG. 3 illustrates the RRM measurement model, including the L1 and L3 filtering of measurement results used in 5G NR systems.

The UE may measure multiple beams (at least one) of a cell, and the measurement results (e.g., power values) are averaged to derive a cell quality. In doing so, the UE can be configured to consider a subset of the detected beams. Filtering takes place at two different levels: at the physical layer (layer 1) to derive beam quality, and then at the RRC layer (layer 3) to derive cell quality from multiple beams. Cell quality from beam measurements is derived in the same way for the service cell(s) and for the non-serving cell(s). The exemplary high-level measurement model is illustrated in FIG. 3 (see 3GPP TS 38.300 v15.3.1 section 9.2.4 incorporated herein by reference).

A: measurements (beam specific samples) internal to the physical layer.

Layer 1 filtering: internal layer 1 filtering of the inputs measured at point A. Exact filtering is implementation dependent. How the measurements are actually executed in the physical layer by an implementation (inputs A and Layer 1 filtering) in not constrained by the 3GPP standard.

$A^1$: measurements (i.e., beam specific measurements) reported by layer 1 to layer 3 after layer 1 filtering.

Beam Consolidation/Selection: beam specific measurements are consolidated to derive cell quality. The behavior of the Beam consolidation/selection is standardized and the configuration of this module is provided by RRC signaling. Reporting period at B equals one measurement period at $A^1$.

B: a measurement (i.e., cell quality) derived from beam-specific measurements reported to layer 3 after beam consolidation/selection.

Layer 3 filtering for cell quality: filtering performed on the measurements provided at point B. The behavior of the Layer 3 filters is standardized and the configuration of the layer 3 filters is provided by RRC signaling. Filtering reporting period at C equals one measurement period at B.

C: a measurement after processing in the layer 3 filter. The reporting rate is identical to the reporting rate at point B. This measurement is used as input for one or more evaluation of reporting criteria.

Evaluation of reporting criteria: checks whether actual measurement reporting is necessary at point D. The evaluation can be based on more than one flow of measurements at reference point C e.g., to compare between different measurements. This is illustrated by input C and $C^1$. The UE shall evaluate the reporting criteria at least every time a new measurement result is reported at point C, $C^1$. The reporting criteria are standardized and the configuration is provided by RRC signaling (UE measurements).

D: measurement report information (message) sent on the radio interface.

L3 Beam filtering: filtering performed on the measurements (i.e., beam specific measurements) provided at point $A^1$. The behavior of the beam filters is standardized and the configuration of the beam filters is provided by RRC signaling. Filtering reporting period at E equals one measurement period at $A^1$.

E: a measurement (i.e., beam-specific measurement) after processing in the beam filter. The reporting rate is identical to the reporting rate at point $A^1$. This measurement is used as input for selecting the X measurements to be reported.

Beam Selection for beam reporting: selects the X measurements from the measurements provided at point E. The behavior of the beam selection is standardized and the configuration of this module is provided by RRC signaling.

F: beam measurement information included in measurement report (sent) on the radio interface.

Layer 1 filtering introduces a certain level of measurement averaging. How and when the UE exactly performs the required measurements is implementation specific to the point that the output at B fulfils the performance requirements set in 3GPP TS 38.133. Layer 3 filtering for cell quality and related parameters used are specified in 3GPP TS 38.331 and do not introduce any delay in the sample availability between B and C. Measurement at point C, $C^1$ is the input used in the event evaluation. L3 Beam filtering and related parameters used are specified in 3GPP TS 38.331 and do not introduce any delay in the sample availability between E and F.

Measurement reports are exemplarily characterized by one or more of the following:

Measurement reports include the measurement identity of the associated measurement configuration that triggered the reporting;

Cell and beam measurement quantities to be included in measurement reports are configured by the network;

The number of non-serving cells to be reported can be limited through configuration by the network;

Cells belonging to a blacklist configured by the network are not used in event evaluation and reporting, and conversely when a whitelist is configured by the network, only the cells belonging to the whitelist are used in event evaluation and reporting;

Beam measurements to be included in measurement reports are configured by the network (beam identifier only, measurement result and beam identifier, or no beam reporting).

Intra-frequency neighbor (cell) measurements and inter-frequency neighbor (cell) measurements are exemplarily defined as follows:

SSB based intra-frequency measurement: a measurement is defined as an SSB based intra-frequency measurement provided the center frequency of the SSB of the serving cell and the center frequency of the SSB of the neighbor cell are the same, and the subcarrier spacing of the two SSBs is also the same.

SSB based inter-frequency measurement: a measurement is defined as an SSB based inter-frequency measurement provided the center frequency of the SSB of the serving cell and the center frequency of the SSB of the neighbor cell are different, or the subcarrier spacing of the two SSBs is different.

NOTE: for SSB based measurements, one measurement object corresponds to one SSB, and the UE considers different SSBs as different cells.

CSI-RS based intra-frequency measurement: a measurement is defined as a CSI-RS based intra-frequency measurement provided the bandwidth of the CSI-RS resource on the neighbor cell configured for measurement is within the bandwidth of the CSI-RS resource on the serving cell configured for measurement, and the subcarrier spacing of the two CSI-RS resources is the same.

CSI-RS based inter-frequency measurement: a measurement is defined as a CSI-RS based inter-frequency measurement provided the bandwidth of the CSI-RS resource on the neighbor cell configured for measurement is not within the bandwidth of the CSI-RS resource on the serving cell configured for measurement, or the subcarrier spacing of the two CSI-RS resources is different.

Whether a measurement is non-gap-assisted or gap-assisted depends on the capability of the UE, the active BWP of the UE and the current operating frequency. In non-gap-assisted scenarios, the UE shall be able to carry out such measurements without measurement gaps. In gap-assisted scenarios, the UE cannot be assumed to be able to carry out such measurements without measurement gaps.

Measurement reporting is defined in section 5.5.3 of 3GPP TS 38.331 v 15.3.0 incorporated herein by reference. The network may configure the UE to derive RSRP, RSRQ and SINR measurement results per cell. Measurement report triggering, including the different trigger events (see below overview), is defined in section 5.5.4 of 3GPP TS 38.331 v 15.3.0 incorporated herein by reference. Details on measurement reporting are provided in section 5.5.5 of 3GPP TS 38.331 v15.3.0 incorporated herein by reference.

Different events A1-A6, B1, B2 are defined, respectively including Leaving and Entering conditions, being associated with a time-to-trigger condition. This allows the UE to measure on its own and report the results according to the criteria defined for the events. An overview is given in the following:

Event A1 (Serving becomes better than threshold)
    Inequality A1-1 (Entering condition): Ms−Hys>Thresh
    Inequality A1-2 (Leaving condition): Ms+Hys<Thresh
Event A2 (Serving becomes worse than threshold)
    Inequality A2-1 (Entering condition): Ms+Hys<Thresh
    Inequality A2-2 (Leaving condition): Ms−Hys>Thresh
Event A3 (neighbor becomes offset better than SpCell)
    Inequality A3-1 (Entering condition): Mn+Ofn+Ocn−Hys>Mp+Ofp+Ocp+Off
    Inequality A3-2 (Leaving condition): Mn+Ofn+Ocn+Hys<Mp+Ofp+Ocp+Off
Event A4 (neighbor becomes better than threshold)
    Inequality A4-1 (Entering condition): Mn+Ofn+Ocn−Hys>Thresh
    Inequality A4-2 (Leaving condition): Mn+Ofn+Ocn+Hys<Thresh
Event A5 (SpCell becomes worse than threshold1 and neighbor/SCell becomes better than threshold2)
    Inequality A5-1 (Entering condition 1): Mp+Hys<Thresh)
    Inequality A5-2 (Entering condition 2): Mn+Ofn+Ocn−Hys>Thresh2
    Inequality A5-3 (Leaving condition 1): Mp−Hys>Thresh)
    Inequality A5-4 (Leaving condition 2): Mn+Ofn+Ocn+Hys<Thresh2
Event A6 (Neighbor becomes offset better than SCell)
    Inequality A6-1 (Entering condition): Mn+Ocn−Hys>Ms+Ocs+Off
    Inequality A6-2 (Leaving condition): Mn+Ocn+Hys<Ms+Ocs+Off
Event B1 (Inter RAT neighbor becomes better than threshold)
    Inequality B1-1 (Entering condition): Mn+Ofn+Ocn−Hys>Thresh
    Inequality B1-2 (Leaving condition): Mn+Ofn+Ocn+Hys<Thresh
Event B2 (PCell becomes worse than threshold1 and inter RAT neighbor becomes better than threshold2)
    Inequality B2-1 (Entering condition 1): Mp+Hys<Thresh1
    Inequality B2-2 (Entering condition 2): Mn+Ofn+Ocn−Hys>Thresh2
    Inequality B2-3 (Leaving condition 1): Mp−Hys>Thresh1
    Inequality B2-4 (Leaving condition 2): Mn+Ofn+Ocn+Hys<Thresh2

The above-indicated parameters are generally the following:
    Ms is the measurement result of the serving cell, not taking into account any offsets.
    Mn is the measurement result of the neighboring cell, not taking into account any offsets.
    Ofn is the measurement object specific offset of the reference signal of the neighbor cell (i.e., offsetMO as defined within measObjectNR corresponding to the neighbor cell).
    Ocn is the cell specific offset of the neighbor cell (i.e., cellIndividualOffset as defined within measObjectNR corresponding to the frequency of the neighbor cell), and set to zero if not configured for the neighbor cell.
    Mp is the measurement result of the SpCell, not taking into account any offsets.
    Ofp is the measurement object specific offset of the SpCell (i.e., offsetMO as defined within measObjectNR corresponding to the SpCell).
    Ocp is the cell specific offset of the SpCell (i.e., cellIndividualOffset as defined within measObjectNR corresponding to the SpCell), and is set to zero if not configured for the SpCell.
    Off is the offset parameter for this event (i.e., a3-Offset as defined within reportConfigNR for this event).
    Hys is the hysteresis parameter for this event (i.e., hysteresis as defined within reportConfigNR for this event).
    Thresh is the threshold parameter for this event (i.e., a1-Threshold as defined within reportConfigNR for this event).
    Thresh1 is the threshold parameter for this event (i.e., a5-Threshold1 as defined within reportConfigNR for this event).
    Thresh2 is the threshold parameter for this event (i.e., a5-Threshold2 as defined within reportConfigNR for this event).
    Mn, Mp, Ms is expressed in dBm in case of RSRP, or in dB in case of RSRQ and RS-SINR.
    Ofn, Ocn, Ofp, Ocp, Hys, Off are expressed in dB.

At least the following mechanisms are based on the measurement results obtained by the UE:
    handover decisions by the gNB based on the measurement results (received via measurement reports)
    triggering of measurement reporting
    radio link failure indication NR-Unlicensed The reason for extending LTE to unlicensed bands is the ever-growing demand for wireless broadband data in conjunction with the limited amount of licensed bands. The unlicensed spectrum therefore is more and more considered by cellular operators as a complementary tool to augment their service offering. The advantage of LTE in unlicensed bands compared to relying on other radio access technologies (RAT) such as Wi-Fi is that complementing the LTE platform with unlicensed spectrum access enables operators and vendors to leverage the existing or planned investments in LTE/EPC hardware in the radio and core network.

However, it has to be taken into account that unlicensed spectrum access can never match the qualities of licensed spectrum access due to the inevitable coexistence with other radio access technologies (RATs) in the unlicensed spectrum such as Wi-Fi. LTE operation on unlicensed bands was therefore at least in the beginning considered a complement to LTE on licensed spectrum rather than as stand-alone operation on unlicensed spectrum. Based on this assumption, 3GPP established the term Licensed Assisted Access (LAA) for the LTE operation on unlicensed bands in conjunction with at least one licensed band. Future stand-alone operation of LTE on unlicensed spectrum, i.e., without being assisted by licensed cells, however shall not be excluded, and such a stand-alone unlicensed operation is now foreseen for 5G NR.

The currently-intended general LAA approach at 3GPP is to make use of the already specified Rel-12 carrier aggregation (CA) framework as much as possible, where the CA framework configuration as explained before comprises a so-called primary cell (PCell) carrier and one or more secondary cell (SCell) carriers. CA supports in general both self-scheduling of cells (scheduling information and user data are transmitted on the same component carrier) and cross-carrier scheduling between cells (scheduling information in terms of PDCCH/EPDCCH and user data in terms of PDSCH/PUSCH are transmitted on different component carriers).

Usage of the unlicensed bands has also become a focus for the new 5G-NR development. The NR licensed design can be used as the baseline, and deployment scenarios such as the following can be considered:

Carrier aggregation between the NR licensed cell (e.g., PCell) and NR unlicensed cell (e.g., SCell) similar to LTE LAA Dual Connectivity (with LTE and with NR); ENU-DC in which the master eNB operates in licensed spectrum and secondary gNB operates in unlicensed spectrum; NNU-DC in which the master NB operates in licensed spectrum and the secondary gNB operates in unlicensed spectrum Stand-Alone (SA): NR-U SA, in which a standalone NR PCell operates in the unlicensed spectrum An NR radio cell with Downlink in unlicensed band and UL in licensed band In NR, Listen-Before-Talk, is to be performed on unlicensed carriers. In particular, transmitting entities perform LBT, and channel occupation is only allowed after a successful LBT Clear Channel Assessment (CCA).

Figure 4:
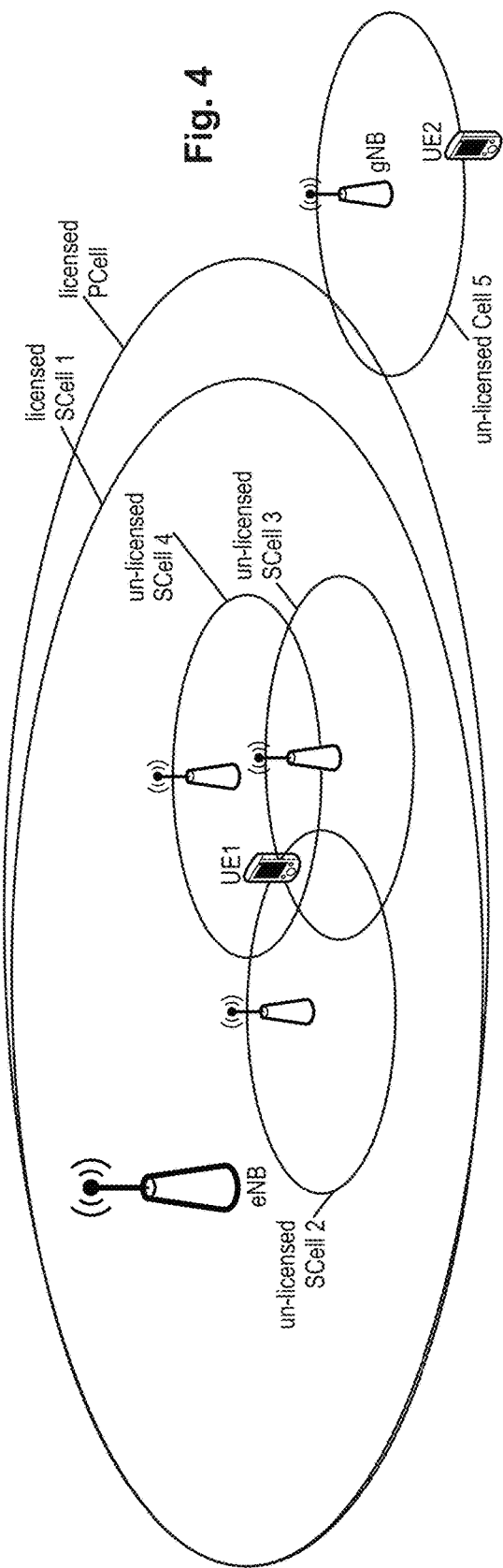
FIG. 4 illustrates an exemplary LAA scenario with several licensed and unlicensed cells.

A very simple scenario is illustrated in FIG. 4, with a licensed PCell, licensed SCell 1, and various unlicensed SCells 2, 3, and 4 (exemplarily depicted as small cells). The transmission/reception network nodes of unlicensed SCells 2, 3, and 4 could be remote radio heads managed by the eNB or could be nodes that are attached to the network but not managed by the eNB. For simplicity, the connection of these nodes to the eNB or to the network is not explicitly shown in the figure. Furthermore, unlicensed radio cell 5 illustrates a stand-alone scenario of an NR PCell that operates in the unlicensed spectrum.

One of the most critical issues is the coexistence with other systems, such as Wi-Fi (IEEE 802.11) systems operating at these unlicensed bands. In order to support fair coexistence between LTE, 5G NR and other technologies such as Wi-Fi, as well as to guarantee fairness between different operators in the same unlicensed band, the channel access for unlicensed bands has to abide by certain sets of regulatory rules which partly may depend on the geographical region and particular frequency band (see, e.g., 3GPP Technical Report TR 36.889, version 13.0.0).

The listen-before-talk (LBT) procedure is defined as a mechanism by which a device applies a clear channel assessment (CCA) check before using the channel. According to one exemplary implementation, the CCA utilizes at least energy detection to determine the presence or absence of other signals on an unlicensed channel in order to determine if a channel is occupied or clear, respectively. European and Japanese regulations for instance mandate the usage of LBT in the unlicensed bands. Apart from regulatory requirements, this carrier sensing via LBT is one way for fair sharing of the unlicensed spectrum and is thus considered to be a vital feature for fair and friendly operation in the unlicensed spectrum in a single global solution framework.

In the unlicensed spectrum, the channel availability cannot always be guaranteed. In addition, certain regions such as Europe and Japan prohibit continuous transmissions and impose limits on the maximum duration of a transmission burst in the unlicensed spectrum (maximum channel occupancy). Hence, discontinuous transmission with limited maximum transmission duration is a functionality for LAA and 5G NR.

The energy detection for the CCA can be performed over the whole channel bandwidth (e.g., 20 MHz in unlicensed bands at 5 GHz), which means that the reception power levels of all subcarriers of an LTE OFDM symbol within that channel contribute to the evaluated energy level at the device that performed the CCA.

Furthermore, the total time during which an equipment has transmissions on a given carrier without re-evaluating the availability of that carrier (i.e., LBT/CCA) is defined as the channel occupancy time (see, e.g., ETSI 301 893, clause 4.8.3.1). The channel occupancy time shall be in the range of 1 ms to 10 ms, where the maximum channel occupancy time could be e.g., 4 ms as currently defined for Europe. Furthermore, there is a minimum Idle time the UE is not allowed to transmit after a transmission on the unlicensed cell, the minimum Idle time being at least 5% of the channel occupancy time. Towards the end of the Idle Period, the UE can perform a new CCA, and so on.

Moreover, the CCA may not be required within a specific time period after receiving a signal by another entity, e.g., within 16 microseconds, as part of a shared COT. For instance, switching between DL and UL, and between UL and DL, within a shared gNB COT, does not require LBT.

Figure 5:
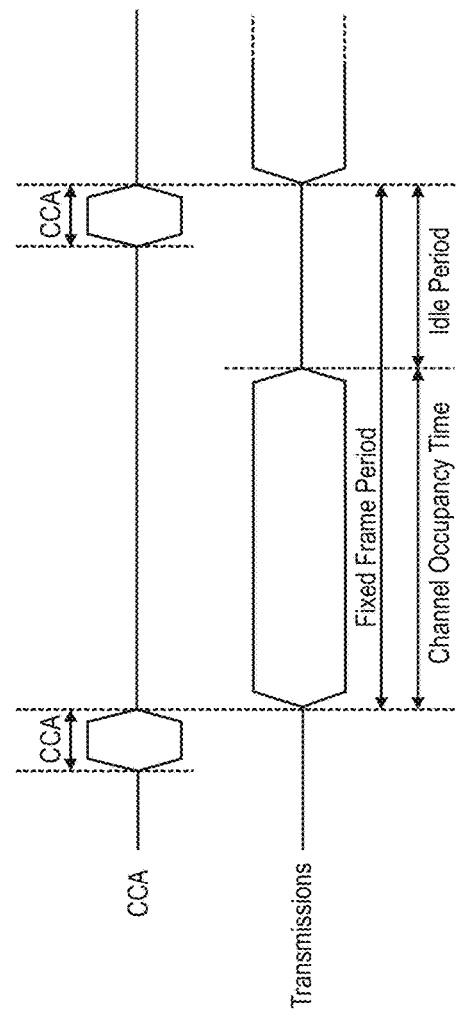
FIG. 5 illustrates the transmission behavior for an LAA transmission.

This transmission behavior is schematically illustrated in FIG. 5 (see, e.g., ETSI EN 301 893).

Consequently, the operation on unlicensed radio cells requires any transmitter to perform Listen-Before-Talk as described above. As identified by the inventors, this LBT requirement has thus to be applied to a variety of mechanism, creating new challenges such as for beam/cell-level mobility and mobility-related measurements.

For instance, the LBT requirements to be complied with by the gNB on the unlicensed channel might negatively impact the transmission of reference signals, such that in case the gNB cannot successfully acquire the unlicensed radio channel, it cannot transmit any reference signal. As a result, the UE cannot use those missing reference signals for performing measurements, which may cause less accurate measurement results (due to having less reference signals). As a further consequence, less accurate measurement results may for instance cause the UE to wrongly control the measurement reporting procedure, to unnecessarily delay the measurement reports, or to wrongly evaluate trigger events. Further, measurement reports with the inaccurate measurement results can also lead to problematic handover decisions by the gNB and thus may result in a poor user experience.

FIG. 6 illustrates exemplarily and in a simplified manner the reference signals that are received by a UE during a measurement time window for performing measurements thereon. As illustrated, the reference signals are received with different powers.

FIG. 7 also illustrates reference signals received by a UE during a measurement time window for performing measurements, in this case however assuming that some reference signals are not received by the UE, e.g., because they could not be transmitted by the gNB due to not having successfully acquired the unlicensed radio channel to comply to LBT requirements. The UE simply cannot decode any reference signal at the expected time-frequency radio resources (exemplary termed in the following missing reference signals).

Nevertheless, it should be noted that there may also be other reasons as to why no reference signals are received at the UE, such as when the base station operates in a low duty cycle mode during which the base station rarely transmits reference signals. Furthermore, although other reference signals are actually received by the UE (to some extent), the power is so low that in prior art solutions they are not considered qualified for being considered in the measurement at all (exemplarily termed in the following non-qualified reference signals). This drop in reference signal power may be caused by e.g., a temporary blocking or fading of the channel. This is exemplarily illustrated in FIG. 8.

In any case however, not all reference signals expected during the measurement window are actually available to the UE for the measurements. In typical prior art solutions, the missing reference signals are ignored for the measurements, such that the measurement results are only calculated based on the available reference signals. For instance, prior art implementations provide a power threshold (also illustrated in FIGS. 6, 7 and 8), and only those reference signals that have a power above the power threshold are used for obtaining the measurement results. Put differently, the missing reference signals do not have a particular impact on the outcome of the measurement results.

However, the measurement results obtained by a UE based on all possible reference signals during the measurement window (see FIG. 6) can be considered more accurate (also more reliable) than the measurement results obtained by a UE based on the reduced set of reference signals (see FIG. 7 and FIG. 8). The less accurate measurement results are not from themselves as such identifiable as being problematic in any manner (i.e., less accurate/reliable) and thus are used in equal manner by the UE and the gNB for the respective mechanisms that are based on the measurement results.

Although not exclusive for the 5G NR unlicensed spectrum scenarios, less accurate measurement results due to missing reference signals can be expected to occur more frequently in 5G NR than in previous communication systems such as in LTE or LTE-A, because of the LBT requirements.

The inventors have recognized these problems in connection with how measurements are performed by the UE and recognized the need for defining an improve measurement procedure, not exclusively but mainly when performing measurements on unlicensed frequency carriers.

In the following, UEs, base stations, and procedures to meet these needs will be described for the new radio access technology envisioned for the 5G mobile communication systems, but which may also be used in LTE mobile communication system. Different implementations and variants will be explained as well. The following disclosure was facilitated by the discussions and findings as described above and may for example be based at least on part thereof.

In general, it should be noted that many assumptions have been made herein so as to be able to explain the principles underlying the present disclosure in a clear and understandable manner. These assumptions are however to be understood as merely examples made herein for illustration purposes that should not limit the scope of the disclosure. A skilled person will be aware that the principles of the following disclosure and as laid out in the claims can be applied to different scenarios and in ways that are not explicitly described herein.

Moreover, some of the terms of the procedures, entities, layers, etc., used in the following are closely related to LTE/LTE-A systems or to terminology used in the current 3GPP 5G standardization, even though specific terminology to be used in the context of the new radio access technology for the next 3GPP 5G communication systems is not fully decided yet. Thus, terms could be changed in the future, without affecting the functioning of the embodiments. Consequently, a skilled person is aware that the embodiments and their scope of protection should not be restricted to particular terms exemplarily used herein for lack of newer or finally agreed terminology but should be more broadly understood in terms of functions and concepts that underlie the functioning and principles of the present disclosure.

For instance, a mobile station or mobile node or user terminal or user equipment (UE) is a physical entity (physical node) within a communication network. One node may have several functional entities. A functional entity refers to a software or hardware module that implements and/or offers a predetermined set of functions to other functional entities of the same or another node or the network. Nodes may have one or more interfaces that attach the node to a communication facility or medium over which nodes can communicate. Similarly, a network entity may have a logical interface attaching the functional entity to a communication facility or medium over which it may communicate with other functional entities or correspondent nodes.

The term "base station" or "radio base station" here refers to a physical entity within a communication network. As with the mobile station, the base station may have several functional entities. A functional entity refers to a software or hardware module that implements and/or offers a predetermined set of functions to other functional entities of the same or another node or the network. The physical entity performs some control tasks with respect to the communication device, including one or more of scheduling and configuration. It is noted that the base station functionality and the communication device functionality may be also integrated within a single device. For instance, a mobile terminal may implement also functionality of a base station for other terminals. The terminology used in LTE is eNB (or eNodeB), while the currently used terminology for 5G NR is gNB.

Figure 9:
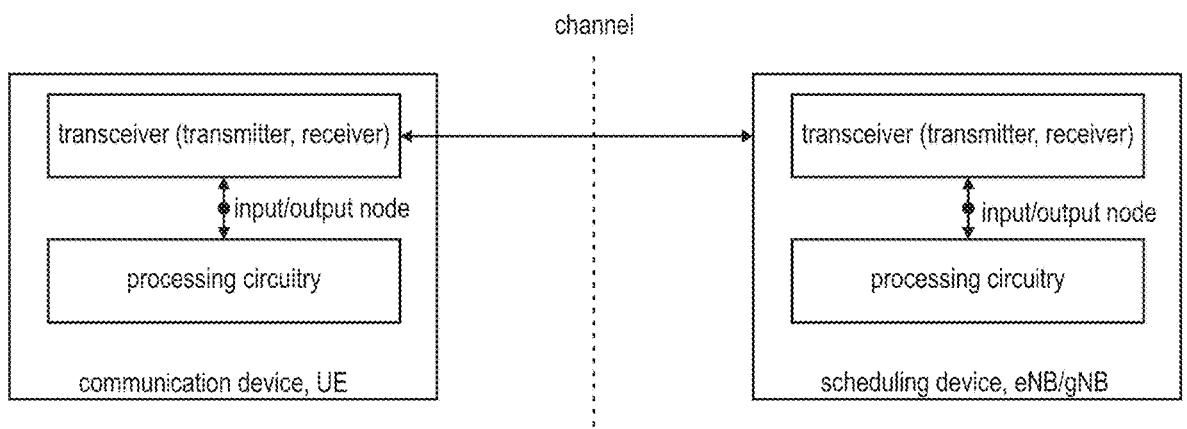
FIG. 9 illustrates the exemplary and simplified structure of a UE and a gNB.

FIG. 9 illustrates a general, simplified and exemplary block diagram of a user equipment (also termed communication device) and a scheduling device (here exemplarily assumed to be located in the base station, e.g., the eLTE eNB (alternatively termed ng-eNB) or the gNB in 5G NR). The UE and eNB/gNB are communicating with each other over a (wireless) physical channel respectively using the transceiver.

The communication device may comprise a transceiver and processing circuitry. The transceiver in turn may comprise and/or function as a receiver and a transmitter. The processing circuitry may be one or more pieces of hardware such as one or more processors or any LSIs. Between the transceiver and the processing circuitry there is an input/output point (or node) over which the processing circuitry, when in operation, can control the transceiver, i.e., control the receiver and/or the transmitter and exchange reception/transmission data. The transceiver, as the transmitter and receiver, may include the RF (radio frequency) front including one or more antennas, amplifiers, RF modulators/demodulators and the like. The processing circuitry may implement control tasks such as controlling the transceiver to transmit user data and control data provided by the processing circuitry and/or receive user data and control data, which is further processed by the processing circuitry. The processing circuitry may also be responsible for performing other processes such as determining, deciding, calculating, measuring, etc. The transmitter may be responsible for performing the process of transmitting and other processes related thereto. The receiver may be responsible for performing the process of receiving and other processes related thereto, such as monitoring a channel.

In the present case as will become apparent from the below disclosure of the different embodiments and variants thereof, the processor can thus be exemplarily configured to at least partly perform the step of performing measurements on various reference signals, of determining the availability of reference signals and of generating corresponding measurement results. The processing circuitry can also at least partly perform the step of determining a measurement accuracy parameter reflecting the measurement accuracy of the performed measurements in different manners. Still another task that can be performed at least partly by the processing circuitry is generating the measurement reports, including the measurement results and if applicable the measurement accuracy parameter.

The transmitter can be configured to at least partly perform the step of transmitting the measurement results, e.g., as a measurement report.

The receiver can in turn be configured to be able to at least partly perform the step of receiving the reference signals.

The solutions offered in the following will be described mainly in connection with the 5G NR standardization for the unlicensed operation (e.g., standalone or dual connectivity). Nevertheless, as already hinted at above, the present concepts, ideas and improvements are not restricted to 5G NR Unlicensed standardization but are equally applicable to the licensed operation of 5G NR and also to the unlicensed and/or licensed operation in LTE-(A) communication systems. Also future communication systems may benefit from the concepts disclosed herein.

A simplified NR-Unlicensed scenario is exemplarily assumed in the following, an example of which is illustrated in FIG. 4, showing various NR-Unlicensed radio cells served by respective gNBs. For instance, UE1 is communicating with the gNB of the unlicensed radio cell via the unlicensed spectrum. In the following, various solutions will be presented with regard to the improved measurement procedure that can be performed by the UEs, such as UE1 or UE2.

Figure 10:
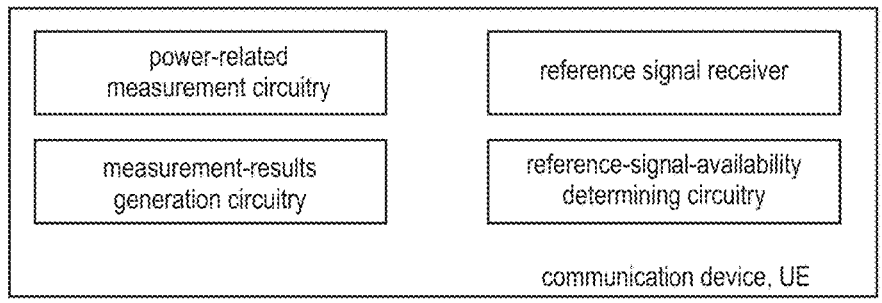
FIG. 10 illustrates a structure of the UE according to an exemplary implementation.

FIG. 10 illustrates a simplified and exemplary UE structure according to the presented solution. The various structural elements of the UE illustrated in said figure can be interconnected between one another e.g., with corresponding input/output nodes (not shown) e.g., in order to exchange control and user data and other signals. Although not shown for illustration purposes, the UE may include further structural elements.

As apparent therefrom, the UE may include a reference signal receiver, power-related measurement circuitry, reference-signal-availability determining circuitry, and measurement-results generation circuitry in order to participate in the improved procedures for performing measurements as will be explained in the following.

One exemplary procedure for the improved measurement procedure will be explained with reference to FIG. 10 and FIG. 11, the latter one being a sequence diagram for the UE behavior according to this improved measurement procedure. As apparent from those exemplary figures, the improved measurement procedure is centered around how the UE performs the measurements on the reference signals to obtain measurement results, and particularly includes a determination on the availability of reference signals.

In more detail, it is assumed that the receiver of the UE receives a plurality of reference signals and is configured to perform measurements thereon. These measurements can be for instance power-related measurements, so as to thereby determine and evaluate the power of the received reference signals. According to the improved measurement procedure, the UE however also determines the availability of the reference signals for the power-related measurements, e.g., to which extent reference signals are available for performing the power-related measurements. Put differently, instead of ignoring that some of the reference signals are actually not available for performing the power-related measurements during the measurement window (such as in prior art systems), the UE actively takes this absence of reference signals into account when generating the measurement results. This absence of reference signals can be taken into account in different manners for generating the measurement results, as will be explained further below in more detail.

Availability in this context can be exemplarily understood in a broad manner in that a reference signal, which is expected to be present and available for performing the power-related measurements by the UE, is actually not available. For instance, a reference signal can be missing altogether, for example because the corresponding base station was not able to send out the reference signal (e.g., can be termed missing reference signals). One reason for the base station to not send out the reference signal is that the base station could not previously acquire the unlicensed radio channel because of the LBT requirements (e.g., clear channel assessment was negative due to other signals blocking the unlicensed carrier) to be complied with on the unlicensed frequency spectrum. Moreover, a reference signal might not be missing completely, but can be considered to not be available for the power-related measurement because its power is so weak that for said reason it is disregarded from being used for the power-related measurement (e.g., can be termed nonqualified reference signals).

By taking the availability of the reference signals into account when generating the measurement results, the measurement results reflect to some extent the availability or non-availability of the reference signals. In other words, the measurement results thus generated by the improved measurement procedure provide a precise evaluation of the power-related measurements on the reference signals. Compared to prior art measurement procedures that ignore non-available reference signals, the improved measurement procedure provides a more reliable and accurate evaluation of the reference signals, and thus a more reliable and accurate measure of the channel quality.

In the following, three different measurement procedures are presented that can be used to generate measurement results that are depending on the determined availability of the reference signals and thus facilitate the above mentioned advantages over the prior art. In brief, the measurement results may directly include a measurement accuracy parameter, which is a measure indicative of the extent of the available and/or non-available reference signals that have been used for performing the power-related measurements and for generating the corresponding measurement results. The measurement accuracy parameter may be for instance based on the number of available reference signals compared to the total number of reference signals that should have been available; alternatively, the measurement accuracy parameter can be based on the time period during neither the reference signals from other sources than the source being measured nor the energy from unknown sources are observed compared to the total time period of the power measurement. According to a further different measurement procedure, instead of providing a separate parameter to reflect the measurement accuracy, the available and not available reference signals have a different impact on the finally determined measurement power values derived from the power-related measurements, such that the measurement power values more adequately represent the status of all the reference signals for the measurement period.

Figure 12:
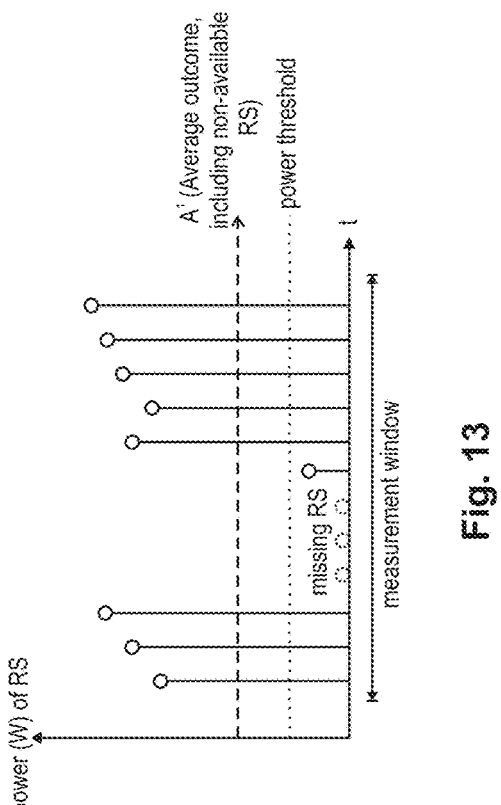
FIG. 12 illustrates reference signals within a measurement period of UE measurements, and measurement results according to a first measurement procedure option.

The first measurement option will be explained in the following in connection with FIG. 12. The UE directly determines the availability of the reference signals, by determining the number of non-available reference signals during a measurement time period. As apparent from FIG. 12, it may be assumed that three reference signals are not transmitted by the corresponding gNB, e.g., because during that time the gNB could not acquire the unlicensed channel (unsuccessful CCA) in line with the LBT requirements. The UE is thus not able to even decode the expected reference signals during that period (indicated a "missing RS" in FIG. 12). Furthermore, it is also assumed that one reference signal, although decodable by the UE, is below a power threshold, and is thus determined to not be qualified for being taking into account for the measurements (similar to prior art systems). Consequently, out of 12 expected reference signals in total during the measurement time period, the UE considers only 8 reference signal transmissions for the measurements while four are determined by the UE to not be available (three missing RS, one non-qualified).

For instance, each time the UE is not able to decode a reference signals or one of the decoded reference signal is below the threshold, the UE increases a corresponding parameter $N_{na}$ by 1, indicating the number of non-available reference signals. The UE keeps also track of all the reference signals that the UE expected and could have been ideally used during that measurement period as $N_{exp}$ (i.e., that should have been transmitted by the base station). Based on this, the UE determines the accuracy of the measurements in form of a suitable parameter. For instance, the UE calculates a ratio $R_{inacc}$ between the parameters $N_{na}$ and $N_{exp}$, $N_{na}/N_{exp}$ as the corresponding measure. $R_{inacc}$ directly reflects the inaccuracy of the measurement, and indirectly also the accuracy of the measurement. In addition or alternatively, the UE may calculate the ratio $R_{acc}$ between the parameters $(N_{exp}-N_{na})/N_{exp}$, thereby comparing the available reference signals $(N_{exp}-N_{na})$ against the total number of expected reference signals during the measurement window. $R_{acc}$ directly reflects the accuracy of the measurement, and indirectly also the inaccuracy of the measurement. As a result, in the presently-assumed scenario of FIG. 12, the measurement accuracy parameter could be ⅓ ($N_{na}/N_{exp}$) or ⅔ (($N_{exp}-N_{na})/N_{exp}$).

According to this first measurement option, the actual power-related measurements can be performed in a usual manner, thereby for instance obtaining an average value of the available reference signals during the measurement time period. The precise measurement algorithm can still be left up to the UE implementations. Exemplarily, the non-available reference signals can be ignored, such that the missing as well as the non-qualified reference signals are not used for the power measurements. This is illustrated as the measurement result value $A^1$ in FIG. 12.

Consequently, the UE not only creates the actual power values as the measurement results, but also a measurement accuracy parameter reflecting the measurement accuracy of the obtained measurement, in this case the measurement result value $A^1$. The measurement accuracy parameter can thus be e.g., considered as part of the measurement results. In any case, the measurements performed by the UE result in a measurement power value (e.g., average of the power of the reference signals during the measurement period) as well as a measurement accuracy parameter that is associated with the measurement power value.

In the above, it has been assumed that the power measurements do not take into account the non-qualified reference signals, due to their low power (i.e., below power threshold). This follows the present understanding of how prior art solutions work. However, a variant of the first measurement option handles these non-qualified reference signals differently. Instead of ignoring the non-qualified low-power reference signals for the measurements, they can also be used when obtaining the measurement power value related to a measurement window. Correspondingly, the previously non-qualified reference signals now would be considered reference signals that are available for the measurements and would not increase the number of non-available reference signals. In the presently assumed scenario of FIG. 12, the parameter $N_{na}$ would be only 3, namely equal to the number of missing reference signals, that the UE could not decode. As a further result, the measurement accuracy parameter generated as well for the measurement results would be $R_{inacc}=3/12=1/4$.

Figure 13:
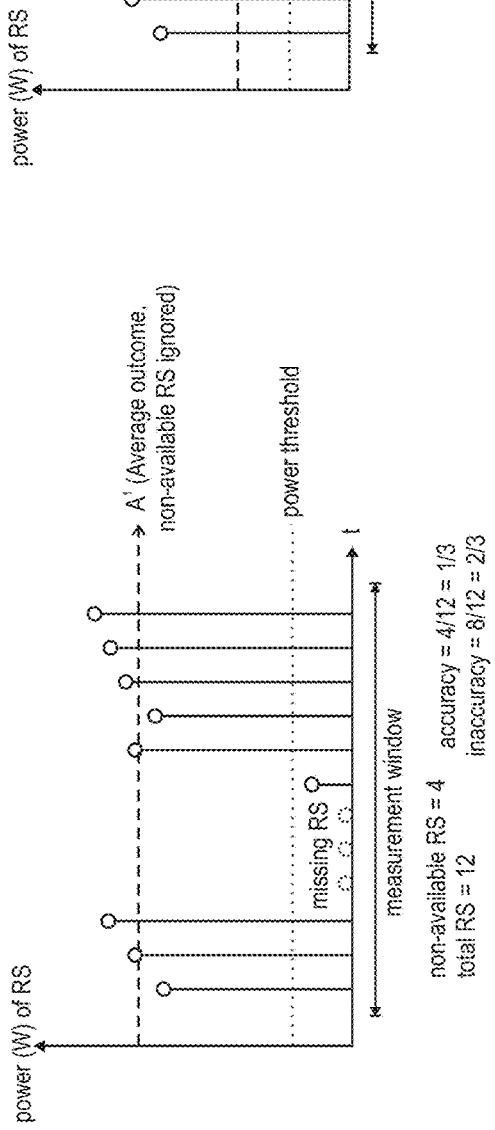
FIG. 13 illustrates reference signals within a measurement period of UE measurements, and measurement results according to a second measurement procedure option.

The second measurement option will be explained in the following in connection with FIG. 13, and is different from the first measurement option in that it is not based on generating a measurement accuracy parameter for taking into account the non-available reference signals. Instead, the second measurement option is based on making the generation of the measurement power value dependent on the availability of the reference signals. In particular, for determining the measurement power value for a measurement period, the UE takes into account not only the qualified reference signals but also those reference signals that are below the power threshold and also the missing reference signals. Thus, only the missing reference signals are actually not available during the actual measurements, since no power value could be measured in said respect; the previously ignored low-power reference signals on the other hand are now considered available for the measurement results.

In the exemplary scenario of FIG. 13 (same as in FIG. 12 and the first measurement option, and already presented in said connection) there are three missing reference signals and one decodable reference signal with a power that is below a power threshold. The UE determines the received power value for each decodable reference signal, using the measured power value for those reference signals above and below the power threshold. For the missing reference signals, which the UE could not decode at the expected time-frequency radio resources and for which no power value could be measured at all, the UE uses a particular power value, such as for instance zero power, or a low positive or negative power value. The particular power values assumed for the missing reference signals (for three missing reference signals in the present example of FIG. 13)

are then used for obtaining the final measurement power value for the entire measurement window. As a result, for example the average power value $A^1$ obtained thereby is significantly lower than when ignoring these missing and low-power reference signals, as done e.g., in the first measurement option (illustrated in FIG. 12). This difference is apparent from the illustrated $A^1$ average power values in FIGS. 12 and 13. The measurement result thus reflects the inaccuracy and unreliability of itself, due to the non-available reference signals, and thus is a more accurate and reliable measure of the reference signals and thus of the cell quality.

In summary, according to the second measurement option, the missing reference signals as well as the low-power reference signals (i.e., below power threshold, ignored in the first measurement option discussed above) have an impact on the measurement results, in this case directly on the average measurement power value output $A^1$. As such, the output $A^1$ depends on the availability of the reference signals.

The impact which a missing reference signals has on the final measurement power value depends on the value used for the power assumed for each of said missing reference signals. In one example variant, the power to be assigned to such missing reference signals can be controlled by the network, e.g., by using a corresponding configuration message (e.g., of the RRC protocol or a MAC control element or using a system information broadcast). This has the benefit that the extent of the impact by the missing reference signals can be changed, e.g., in accordance with the use of different communication services or depending on the cell quality or depending on the UE capabilities. Other alternatives of how the UE knows which power to assign to such missing reference signals when obtaining the measurement results can be to define a fixed power value in one of the 3GPP specifications.

As already mentioned, the predefined power value can be e.g., zero power, or a low positive or low negative power. The higher the predefined power value is (but still assumed to be similar to typical power values), the less impact it may have on the overall measurement results. On the other hand, using negative values for the power increases the impact on the overall measurement results.

Moreover, instead of being completely predefined, the power assigned to such missing reference signals can be exemplarily dependent on the other power measurements. For instance, the power could be only a certain percentage of the directly previously received reference signals, or may be the average of the reference signals received directly before and after the missing reference signal. Thereby, the UE could first perform the measurements on the decoded reference signals and then define which power values to assign to the missing reference signals.

Moreover, the second measurement option can also be applied to the L3 filtering. That is, when L1 considers a measurement result is not accurate and chooses to not report such inaccurate result to L3 filtering, the L3 filter can consider such missing report from L1 filter as the result having zero value or some other values.

The third measurement option will be explained in the following in connection with FIG. 14. Similarly as in the first measurement option, the third option is based on determining a separate measurement accuracy parameter while not particularly adapting the actual power measurement and averaging. Consequently, the UE directly determines the availability of the reference signals, by determining the periods of time, within the measurement window, during which other signals occupy the channel. In more detail, as explained before in connection with the operation of unlicensed channels in 5G NR but also 4G communication systems, the unlicensed frequency is shared by different radio access technologies, such as 4G-LTE, 5G, WiFi, etc. The reference signals to be used for the measurements cannot be transmitted by the respective base station when that same unlicensed channel is blocked by another entity sending out other signals. This can be determined by the UE, thereby deriving that during the time that the channel is occupied no reference signals are available for the measurement procedure; the reference signals are missing during the channel occupancy time of another entity.

The accuracy of the measurement can be determined based on the duration of this channel occupancy time of another entities, e.g., when taking in relation to the measurement time period. For instance, a ratio $R_{inacc}$ of the channel occupancy time by another entity $T_{occupy}$ vs the measurement time period $T_{meas}$, $T_{occupy}/T_{meas}$ can be used to indicate the accuracy of the measurement. In this case, $R_{inacc}$ is directly reflecting the inaccuracy of the measurement, such that the accuracy decreases with increasing ratio $R_{inacc}$. In addition or alternatively, the measurement accuracy parameter can also be the ratio $R_{acc}$ between the time that the channel is not occupied relative to the measurement time period, i.e., $(T_{meas}-T_{occupy})/T_{meas}$, such that the ratio $R_{acc}$ directly reflects the accuracy of the measurement, the accuracy increasing with the increasing ratio.

In other implementations of the third measurement option, the channel occupancy time can be further differentiated, between signals from other known sources and signals from other unknown sources. In more detail, the UE may receive and decode signals and therefrom it determines that the decoded signal is from another source than the one where the reference signals to be measured originate. For instance, the UE can do this by checking if the decoded signal contains a Wi-Fi preamble or NR specific preamble like the SFI-PDCCH or Wi-Fi/NR common preamble. This specific channel occupancy time can be termed $T_{occupy\_known}$.

On the other hand, the UE may determine energy on the measured radio channel, the UE is however unable to decode the signal and thus fails to identify the source of the energy/signal. In an exemplary implementation, the UE may further compare the measured energy from this unknown source with a suitable threshold in order to avoid considering unrelated energy sources into the channel occupancy time, because such unknown source with weak energy is not likely to affect the LBT outcome of the measured source. This specific channel occupancy time can be termed $T_{occupy\_unknown}$.

The total channel occupancy time by other sources (be it known or unknown) $T_{occupy}$ (see above) can thus be calculated by summing both $T_{occupy\_known}$ and $T_{occupacy\_unknown}$. The unit of time for the channel occupancy time can be e.g., ms or OFDM symbols.

As mentioned above, the measurement accuracy parameter in this third measurement option can be expressed for example by $T_{occupy}/T_{meas}$. In addition or alternatively, two distinct measurement accuracy parameters can be determined by the UE, based on $T_{occupy\_known}$ and $T_{occupacy\_unknown}$; particularly, $T_{occupy\_unknown}/T_{meas}$ and $T_{occupy\_known}/T_{meas}$.

Figure 14:
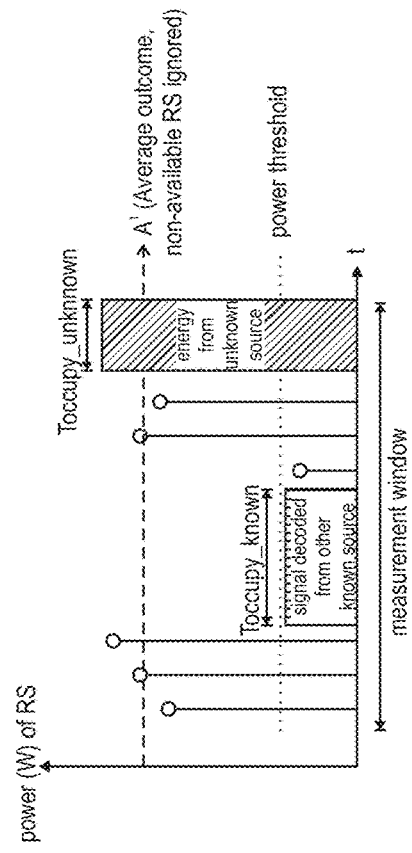
FIG. 14 illustrates reference signals within a measurement period of UE measurements, and measurement results according to a third measurement procedure option.

This is illustrated in FIG. 14, where the two different channel occupancies are assumed in the middle and to the end of the measurement window.

According to this third measurement option, in one implementation the actual power-related measurements can be performed in a usual manner, thereby obtaining for instance an average value of the available reference signals during the measurement time period. This may or may not include the low-power reference signals, i.e., the reference signals that have a measured power below a power threshold. The precise measurement algorithm can be still left up to the UE implementations.

In summary, the UE does not only create the actual power value as the measurement result, but also at least one measurement accuracy parameter, reflecting the measurement accuracy of the obtained measurement. The measurement accuracy parameter can thus be e.g., considered as part of the measurement results. In any case, the measurements performed by the UE generate in a power measurement value and a measurement accuracy parameter being associated with the measured power value.

In one exemplary implementation, for the purpose of determining the signal power of other entities on the unlicensed radio channel, the UE may use the same or similar procedure as already used when preparing a channel occupancy report in the LTE-LAA scenarios. In particular, this involves that the LTE-LAA UEs can be configured to report channel occupancy as a part of RRM measurements. In particular, the channel occupancy is defined in LTE-LAA as the percentage of time when the channel is sensed to be busy, i.e., when the RSSI of any sample (including the samples from both the known and unknown source) is above a predefined threshold.

The above three measurement options have been described as separate options. A UE may be capable of at least one of the above described measurement options and respective variants. In one exemplary solution, the UE is able to perform any of these measurement options. Each of the options facilitates particular advantages as will be explained in the following.

In particular, the first measurement option presents a simple way of obtaining a separate measurement accuracy parameter, as it only involves the counting of reference signals during the measurement period and providing a measure with respect to the total expected number of reference signals.

On the other hand, the second measurement option does not need to create a new parameter, because the measurement power values depend and thus reflect to some extent the accuracy of the measurement. This is also beneficial in view of that it is not necessary to report an additional parameter to the base station with the measurement report (see later for more details). Furthermore, only a few corresponding definitions need to be agreed upon in said respect in the standardization (e.g., to be incorporated into a 3GPP technical specification).

Moreover, the third measurement option with its measurement accuracy parameter not only provides a measure of the accuracy of the measurement, but also provides information as to the LBT activities on that unlicensed channel during the measurement period. Furthermore, depending on the implementation, option 3 can provide a finer granularity of the accuracy parameter than option 1, especially for small measurement periods and few reference signals. However, obtaining information on the channel occupancy period related to other signals can be more complicated than e.g., counting non-available reference signals as done for the first measurement option.

In order to be able to flexibly operate the UE with the different measurement options, it is possible to selectively use the different measurement options depending on the circumstances. For instance, which measurement option to use can depend on whether intra-frequency measurements or inter-frequency measurements are performed. Intra-frequency measurements are performed on the serving frequency of the serving radio cell to which the UE is currently connected, whereas inter-frequency measurements are performed on a frequency that is different from the serving frequency, e.g., used by a neighbor cell.

According to one exemplary implementation, when the UE performs measurements on its serving frequency, it can perform the measurements based on any of the available measurement options, 1, 2 or 3 (i.e., for intra-frequency measurements). On the other hand, when the UE performs measurements on another frequency than its serving frequency, it may avoid performing the measurements based on option 3 due to the increased complexity involved for deriving the measurement accuracy parameter(s) according to said option; rather, the UE can follow measurement options 1 or 2 when performing measurements on another frequency than the serving frequency (i.e., for inter-frequency measurements). Typically, when the UE performs measurements on another frequency, the UE needs to switch to this other frequency before being able to start the measurements. Consequently, there is less time for elaborate measurements and calculations, such as needed for measurement option 3.

The UE can then decide which one of the measurement options is to be used, i.e., either option 1 or 2 for inter-frequency measurements. For instance, if UE's services are quite sensitive to the delay, the UE may decide to use option 1 because option 1 provides more detailed information in terms of the availability of the concerned cell.

In addition or alternatively, the UE may be configured by the network as to which measurement option to use for which measurement. For instance, the measurement configuration, that already defines what the UE has to measure, could additionally indicate which measurement option to use, e.g., for each measurement type which measurement option. Also other configuration messages, such as of the RRC protocol, can be used by the gNB (or another network entity) to correspondingly instruct the UE.

In the above explanations, power thresholds were repeatedly mentioned, e.g., for being used during the measurements so as to identify low-power reference signals that can be dismissed for the measurements. These power thresholds can be defined in advance, e.g., by the network or using definitions in the 3GPP technical specifications, they may also be implementation specific and thus left to the manufacturers of the UE or chips in the UE.

In the above, an improved measurement procedure was described to be performed by the UE. In further exemplary implementations, these measurements can be performed repeatedly by the UE and on different frequencies and radio cells. For instance, the UE is configured to perform measurements on its own serving cell as well as other neighboring cells. For each of these radio cells for which the UE is configured to perform the measurements, the UE determines a measurement result value per measurement window and a measurement accuracy parameter according to measurement options 1 and/or 3. It is further exemplarily possible to average the measurement power values and accuracy parameters obtained for numerous measurement windows, to obtain a long-term evaluation of the channel based on the reference signals, similar or the same to what is done for the L3-filtering at the RRC layer.

One reason for the UE to perform these measurements is to assist the network-based mobility mechanism, such as deciding whether to handover the UE from the present radio cell to another target radio cell. To said end, the measurement results are reported to the network (e.g., base station, gNB) within a so-called measurement report.

Whether or not measurement results are to be transmitted is typically controlled by the UE following predefined rules, e.g., trigger events that are based on the measurements obtained for the serving cell of the UE and/or other neighbor cells. The measurement option 2 generates different measurement power values, such that also current trigger events and conditions benefit from the more accurate and reliable measurement power values generated based on this improved measurement option 2.

In addition, it would also improve the measurement reporting procedure, when the trigger events and conditions are adapted take into account the measurement accuracy parameter generated according to measurement options 1 and 3. In more detail, depending on the trigger event and the corresponding condition, the accuracy and reliability of the measurement, which underlies the trigger event and condition, can be evaluated as well, e.g., by comparing same to a threshold. For example, if a trigger event and condition is dependent on a measurement power to be larger than a threshold, then, an additional condition could be defined to be also fulfilled for this trigger event to occur, namely that the accuracy of the measurement needs to be large enough. Put in other words, the measurement result should not only be good enough, but also reliable enough. For instance, assuming that the measurement accuracy parameter directly indicates the accuracy of the measurement (rather than its inaccuracy), then, the measurement accuracy parameter should be higher than the threshold for that trigger condition to be fulfilled.

As another converse example, if another trigger event and condition is dependent on a measurement power to fall lower than a threshold, an additional condition could be defined to be alternatively fulfilled for this trigger event to occur, namely that the accuracy of the measurement accuracy should not be too low. Put in other words, the trigger condition might already be fulfilled, when only the measurement result is not reliable enough anymore. For instance, assuming that the measurement accuracy parameter directly indicates the accuracy of the measurement (rather than its inaccuracy), then, the measurement accuracy parameter should be lower than the threshold for that trigger condition to be fulfilled.

This may be also applied to the measurement reporting procedure as currently defined for the existing 5G NR framework, which defines numerous trigger events A1-A6, B1, B2, and respectively entering conditions, leaving conditions, and time to trigger (TTT) parameters.

For example, the entering and leaving conditions for Event A1 (Serving becomes better than threshold) can be further extended as follows. It is assumed that $R_{inacc}$ is the measurement accuracy parameter related to the measurement of Ms Event A1 (Serving becomes better than threshold)
  Inequality A1-1 (Entering condition): When both conditions are met, the UE sends the measurement report
  Ms−Hys>Thresh
  $R_{inacc}$<$R_n$ Inequality A1-2 (Leaving condition): When one of the leaving conditions is met, the UE stops sending the measurement report
  Ms+Hys<Thresh
  $R_{inacc}$>$R_n$ Based on the same logic, some or all of the remaining trigger events A2-A6, B1, and B2 can be extended with additional measurement-accuracy-related parameters.

For example, the entering and leaving conditions for Event A3 (neighbor becomes offset better than SpCell) can be further extended as follows. It is assumed that $R_{inacc}$ is the measurement accuracy parameter related to the measurement of Mn or Mp.

Event A3 (neighbor becomes offset better than SpCell)
  Inequality A3-1 (Entering condition): When both conditions are met, the UE sends the measurement report
  Mn+Ofn+Ocn−Hys>Mp+Ofp+Ocp+Off
  $R_{inacc}$<$R_n$ Inequality A3-2 (Leaving condition): When one of the leaving conditions is met, the UE stops sending the measurement report
  Mn+Ofn+Ocn+Hys<Mp+Ofp+Ocp+Off
  $R_{inacc}$>$R_n$ As a further example, the entering and leaving conditions for Event A5 (PCell becomes worse than threshold1 and neighbor becomes better than threshold2) could be adapted as follows. In A5, the first entry condition, "PCell becomes worse than threshold1," can be alternatively fulfilled by the condition "PCell measurement accuracy is below an accuracy threshold"; while the second entry condition, "neighbor becomes better than threshold2," must be fulfilled together with the condition "neighbor cell measurement accuracy is above the accuracy threshold."

In the above description so far, the power measurements and resulting power values have not been explained in detail, because different implementations are possible. For instance, power-related measurements such as RSRP, RSRQ, RSSI, SINR or another suitable type of measurement can be used in said respect by the UE.

In order that also other entities, such as the serving base station of the UE, are able to benefit from the improved measurements results obtained by the above discussed three measurement options, the measurement reporting can be adapted accordingly. In general, the measurement results obtained by the improved measurement procedures can be transmitted to the base station within a measurement report, be it with or without additional measurement accuracy parameter(s).

For example, the UE might be configured to report measurements on a plurality of radio cells, including its own serving radio cell as well as other neighbor radio cells (e.g., one or more of inter-frequency, intra-frequency, inter-RAT). The UE complies with the configured measurement reporting, by compiling the measurement report accordingly. It can include the measurement results obtained for these configured radio cells.

With regard to option 2, no additional information elements (measurement accuracy parameter) are generated, such that no extension to the measurement report is necessary.

However, for options 1 and 3, the UE generates an additional measurement accuracy parameter in association with the corresponding measured power value and may include these into the measurement report. This can be done in different ways.

In one exemplary implementation, for each reported radio cell (e.g., serving cell or non-serving cell), the measurement power value (such as RSRP or RSRQ or SINR) as well as the associated measurement accuracy parameter are included into the measurement report.

The serving base station, receiving this extended measurement report, can then use all the available information to decide whether to handover the UE to a neighbor cell or not. For instance, the base station may not want to handover a delay-sensitive UE to a neighbor cell, which has a high RSRP value, but where the measurement accuracy parameter indicates a high degree of inaccuracy or unreliability (e.g., $R_{inacc}$ is higher than a threshold).

In another implementation, the number of additional bits to be transmitted in the measurement report can be reduced, by not transmitting the measurement accuracy parameter as such but instead transmitting a 1-bit indication indicating whether the measurement is accurate or not (reliable or not). This distinction can be done exemplarily by comparing the measurement accuracy parameter against a suitable threshold value, e.g., the threshold being 0.5, i.e., 50%. The threshold for this distinction can be configured e.g., by the network (e.g., serving base station) e.g., using an RRC configuration message or can be indicated by one of the 3GPP technical specifications. Giving the network the possibility to configure the threshold value is beneficial, as the accuracy decision can be adapted and changed depending on the circumstances (such as the load of the radio cell, the capabilities of the UE, etc.). Such a solution is simple, requires less accuracy and likely involves less effort in the 3GPP standardization process.

Figure 11:
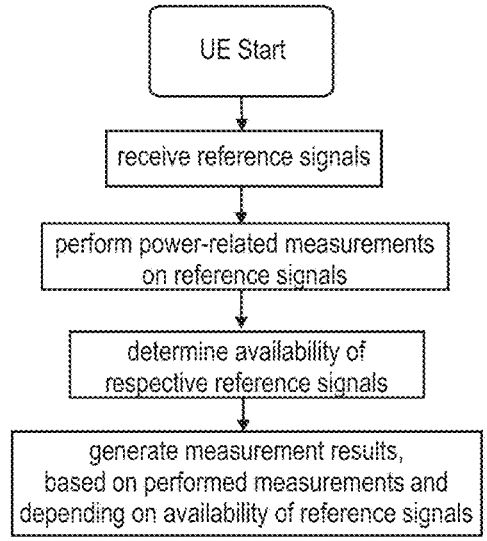
FIG. 11 is a flow diagram for the behavior of a UE, according to an exemplary implementation.
Figures 15, 16:
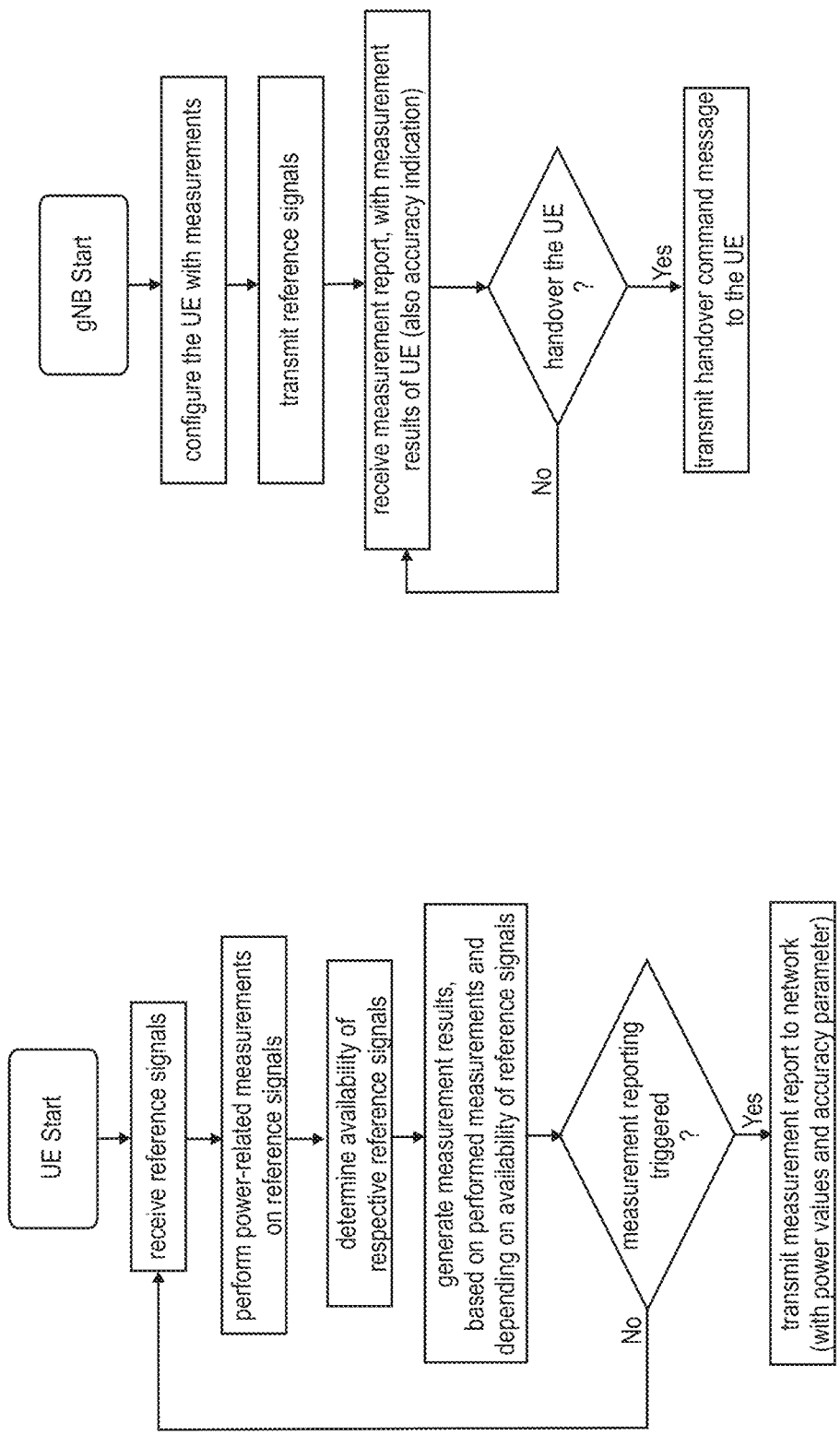
FIG. 15 is a flow diagram for the behavior of a UE, according to a further exemplary implementation, that also comprises the measurement reporting.
FIG. 16 is a flow diagram for the behavior of a gNB, according to an exemplary implementation.

When implementing the improved measurement reporting into the existing 5G NR framework, the currently defined measurement result information element MeasResults (see TS 38.311 v15.3.0 section 6.3.2 incorporated herein by reference) can be adapted to also carry the accuracy parameter, according to the following example:

A general and exemplary UE behavior involving the triggering of the measurement reports (see above explanations) as well as the actual reporting is illustrated in FIG. 15, which is an extension of the UE behavior illustrated in FIG. 11 and explained above. As apparent therefrom, the UE repeatedly performs the step of determining whether the measurement results need to be reported to its serving station or not. This can be done by checking the above-explained trigger events and conditions (e.g., trigger events A1-A6, B1, B2 in the 5G NR exemplary implementation). If reporting is triggered (Yes in FIG. 15), the UE generates and transmits a measurement report to its serving base station. The content of the measurement report also depends on the measurement option chosen for the measurements. For instance, in FIG. 15 it is exemplarily assumed that the measurement report also includes a measurement accuracy parameter associated with the measured power values of the reference signals.

FIG. 16 illustrates the behavior of the gNB, being the serving base station of the UE, according to an exemplary implementation of the above discussed solutions. As explained above, the gNB can be responsible for configuring the measurements to be performed by the UE, as explained already above from the perspective of the UE, and thus may for instance involve one or more of the following: the radio cells to be measured, the quantities to be reported, the measurement options to use, the threshold(s) to apply when performing the measurements, the trigger events for reporting the measurement results, etc. The UE correspondingly performs the measurements and eventually reports the results as a measurement report. In said respect, the gNB transmits the reference signals in its radio cell, at least to the user equipment. The gNB receives the measurement report with the measurement results generated by the UE, which, assuming e.g., measurement options 1 or 3, also includes a measurement accuracy parameter. The gNB is responsible for controlling mobility of the UE, based on the received

```
MeasResultNR ::=            SEQUENCE {
    physCellId              PhysCellId                              OPTIONAL,
    measResult              SEQUENCE {
        cellResults         SEQUENCE{
            accuracy                AccuracyParameter               OPTIONAL,
            resultsSSB-Cell         MeasQuantityResults     OPTIONAL,
            resultsCSI-RS-Cell      MeasQuantityResults     OPTIONAL
        },
        rsIndexResults      SEQUENCE{
            results SSB-Indexes         ResultsPerSSB-IndexList     OPTIONAL,
            resultsCSI-RS-Indexes       ResultsPerCSI-RS-IndexList  OPTIONAL
        }
}
```

The new accuracy parameter can be defined e.g., as follows:

```
AccuracyParameter       CHOICE {
    ratio-absent-RS         RatioAbsentRS,
    ratio-occupy-other      RatioOccupyOther
}                           OPTIONAL,
```

The sub-parameter ratio-absent-RS refers to the measurement accuracy parameter ratio $R_{acc}$ or $R_{inacc}$ obtained according to measurement option 1. The sub-parameter ratio-occupy-other refers to the measurement accuracy parameter ratio $R_{acc}$ or $R_{inacc}$ obtained according to measurement option 3.

radio cell measurements, and thus decides whether and when to handover the UE to another radio cell. If the UE is to be handed over to another cell (Yes in FIG. 16), the gNB can proceed with performing a usual handover procedure with the UE and the suitable target radio cell. This involves for instance that a handover command message is transmitted to the UE.

Figure 19:
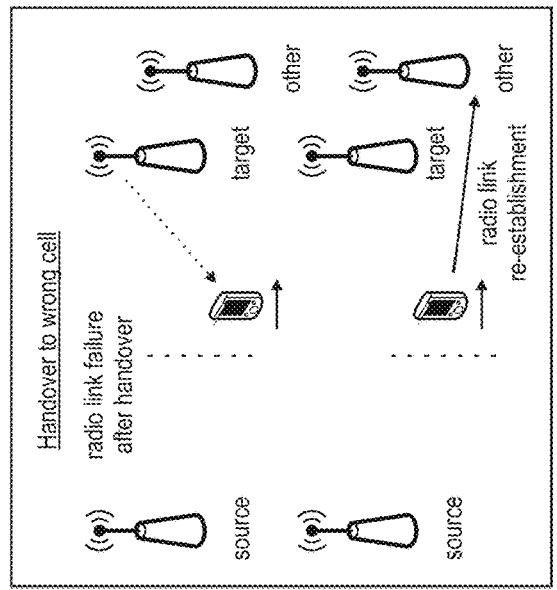
FIGS. 17, 18 19 illustrate three different radio link failure scenarios during the handover process, including the handover-too-late scenario, the handover-too-early scenario, and the handover-to-wrong-cell scenario.
Figure 18:
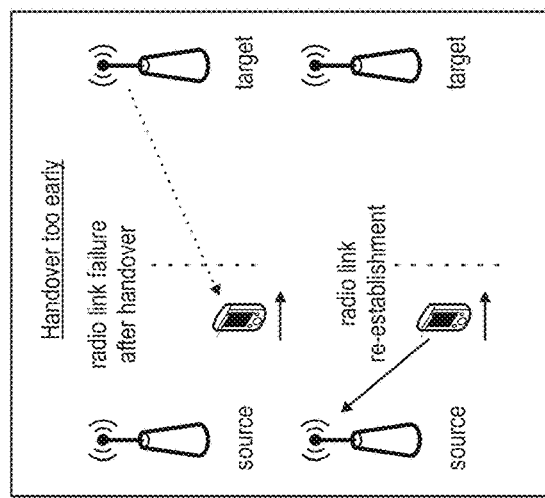
Figure 17:
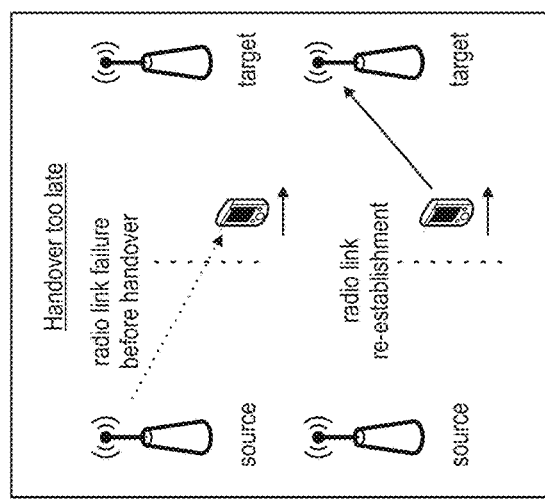

Another mechanism that may benefit from the improved measurement results obtained by the above-described implementations relates to the radio link failure indication mechanism. The radio link failure indication mechanism allows to provide information about a radio link failure that occurred previously to the UE. In particular, different miss-judgements of the gNB can lead to a handover decision that results in a radio link failure at the UE. FIGS. 17, 18, and 19 respectively illustrate different scenarios of radio link failures, FIG. 17 the "handover too late" scenario, FIG. 18 the "handover too early" scenario, and FIG. 19 the "handover to wrong cell" scenario.

In the handover-too-late scenario (see FIG. 17), the UE is instructed too late to handover from its current serving radio cell to the target cell, such that the UE already loses the connection to its source radio cell before having established the new connection to the target radio cell. As a result, the UE experiences a radio link failure (i.e., to the source radio cell) and shortly thereafter is able to reestablish its connection to the target radio cell.

In the handover-too-early scenario (see FIG. 18), the UE is instructed too early to handover from its current serving radio cell to the target cell, such that the UE, after disconnecting with the source radio cell, is not able to set up the connection with the target radio cell. As a result, the UE experiences a radio link failure (i.e., to the target radio cell). Assuming it is still in reach of the serving radio cell, the UE may e.g., reestablish its connection with the source radio cell.

Figure 20:
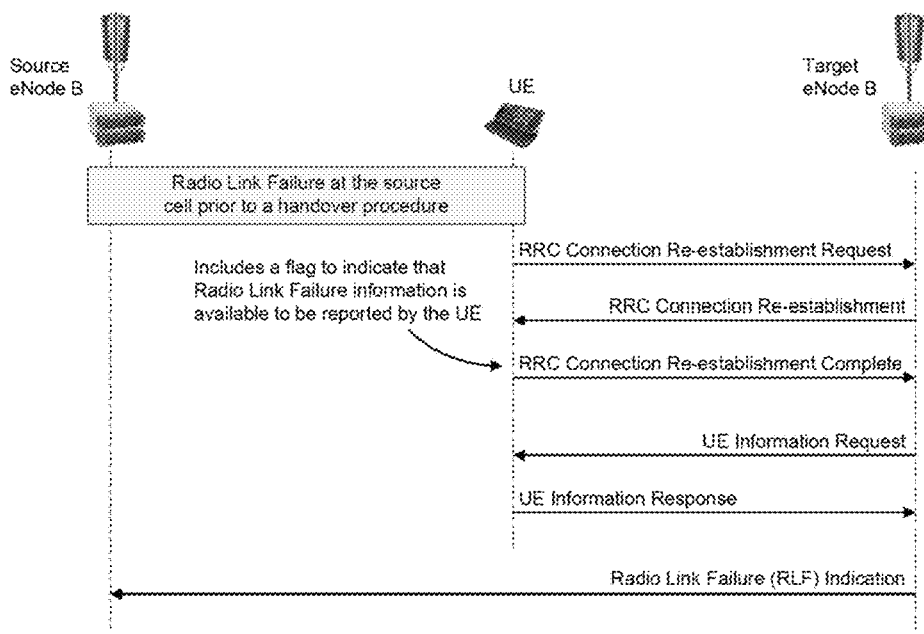
FIG. 20 illustrates the signaling exchange between the UE, the source eNB, and the target eNB, in connection with a handover-too-late scenario.

In the handover-to-wrong-cell scenario (see FIG. 19), the UE is instructed to handover to a wrong cell (target cell in FIG. 19), to which a connection establishment is not possible, e.g., because the cell quality is not good enough. The UE thus is not able to establish a connection to this wrong cell The signaling exchange between the UE, the target radio cell and source radio cell is exemplary discussed for the handover-too-late scenario based on FIG. 20. As illustrated in FIG. 20, the radio link failure is experienced at the source cell prior to the handover procedure. The UE reestablishes the RRC connection with the target base station including the exchange of "RRC Connection Re-establishment Request," "RRC Connection Re-establishment" and "RRC Connection Re-establishment Complete" messages. Subsequently, the target base station can transmit a UE information request to the UE, for instance to obtain information about the radio link failure. The UE responds with a UE information response message, which includes the detailed information about the radio link failure, including the cause of the radio link failure, the measurement results, the location information, the cell identity of the previous serving cell, etc. Then, a Radio Link Failure Indication message is transmitted from the target cell to which the UE is now connected, to the source radio cell. The Radio Link Failure Indication message is a message comprising relevant information on the radio link failure such as the ID of the radio cell whose connection failed, measurement results with respect to that failure radio cell, a connection failure type (if known) etc.

This message exchange thus provides information to the source base station, such that it can adapt the necessary parameters in connection with initiating a handover for other UEs such that a radio link failure is avoided in the future. For instance, in the handover-too-late case, the source base station may configure the measurement reporting of the UE such that the UE reports the measurements earlier. Conversely, in the handover too early case, the source base station may configure the measurement reporting of the UE such that that the UE can report the measurement later. For example, if the source gNB finds that the handover-too-early case was caused by the high inaccuracy of the target cell, the source gNB may configure the trigger event A3 such that the measurement report is not triggered so easily (e.g., by decreasing the Ofn value or increasing the TTT value). Alternatively, gNB can configure a very small Ocn value for the problematic cell, so that the UE will also not trigger the A3 event easily.

As a further example, in the handover too early case, the UE Information Response message is utilized by the source gNB, and there is no need for the transmission of the RLF Indication message.

The UE information message used in the above-discussed radio link failure scenarios may not only include measured power values but also the measurement accuracy parameter(s) if created by any of the above-mentioned measurement options. Correspondingly, the RLF indication message may also be extended to carry measurement accuracy parameters. One example of the RLF Indication message is defined in the following.

| Radio Link Failure Indication message | | |
|---|---|---|
| Failure Cell PCI | | |
| Re-establishment EUTRAN Cell Global Identity (ECGI) | | |
| C-RNTI | | |
| ShortMAC-I | | |
| UE RLF Report Container | Measurement Result from Last Serving Cell | RSRP RSRQ |
| | Measurement Result from Neighboring Cells | Measurement Result List from NR (including the $R_{absent}$ (or $R_{occupy\_other}$) information) Measurement Result List from EUTRAN |
| | (Alt.) Channel Occupancy Report | |
| | Location information | |
| | Failed PCell Id | CGI or, PCI + ARFCN |
| | Re-establishment Cell Id | CGI |
| | Time Connection Failure | |
| | Connection Failure Type | t310-Expiry, or randomAccessProblem, or rlc-MaxNumRetx, or t312-Expiry-r12 (Alt.) too-congested-in-unlicensed-spectrum |
| | Previous PCell Id | CGI |
| RRC Connection Setup Indicator | | |

As apparent from the above, the measurement results for the neighboring cells can be extended with a corresponding measurement accuracy parameter, e.g., according to option 1 ($R_{absent}$) or option 3 ($R_{occupy\_other}$). It has been exemplarily assumed that the measurement results for the last serving cell are not carried with measurement accuracy parameter. In this case, the serving cell may already know roughly the accuracy of the measurement by referring to the LBT history log. In addition or alternatively, also the measurement results from the last serving cell may include suitable accuracy parameter so as to assist the network-side operation.

In addition or alternatively, a new connection failure type could be defined indicating that the unlicensed spectrum is too congested. This can e.g., be implemented based on measurement option 3, which determines the time period that the measured radio cell is occupied by other signals. For example, if the ratio between the time occupied by other signals and the overall measurement period is higher than a particular threshold, the unlicensed channel could be considered too congested and thus could be indicated as such as the failure of the failed connection establishment.

In addition or alternatively, the channel occupancy report used in LTE-LAA can be also added to the UE Information Response and therefore be carried through the Radio Link Failure Indication message.

Figure 21:
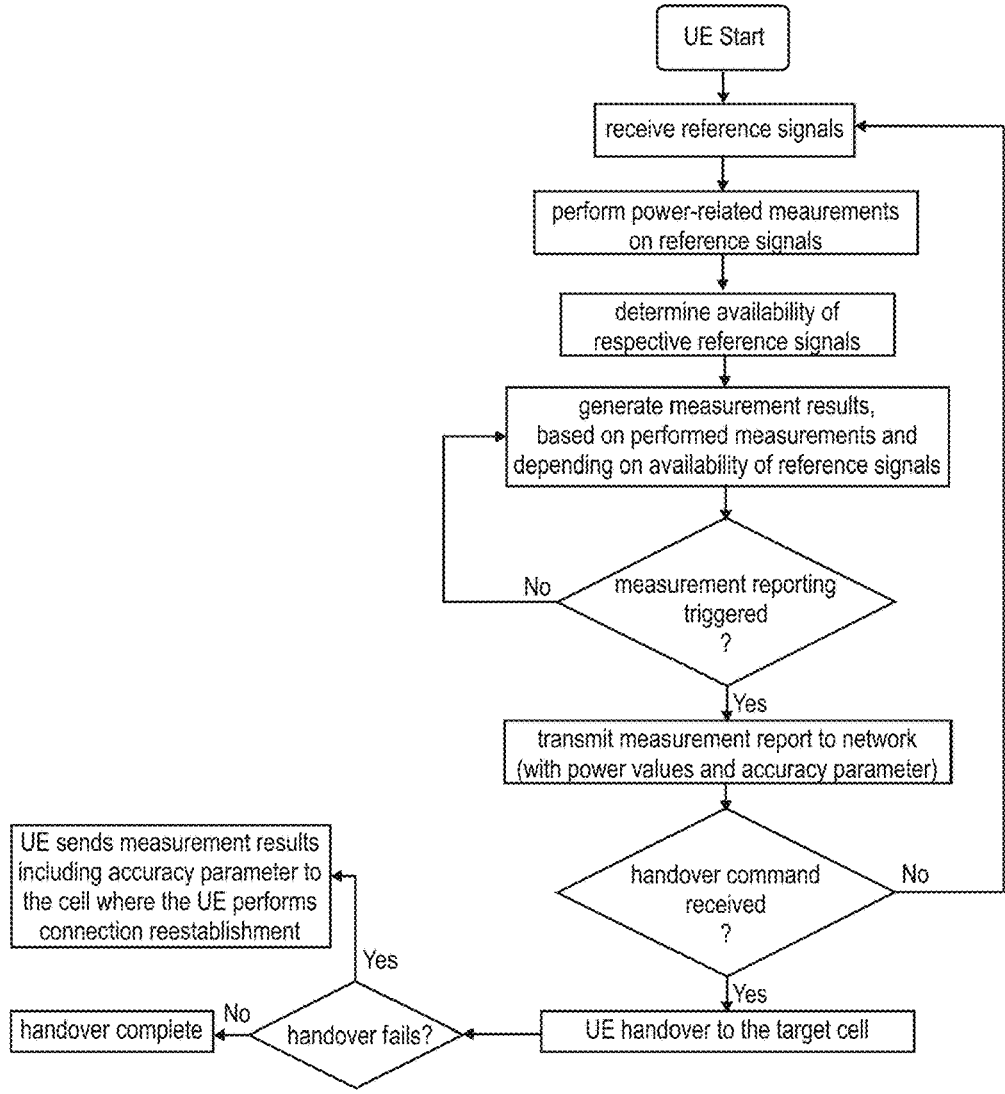
FIG. 21 is a flow diagram for the behavior of a UE, according to a further exemplary implementation, that also comprises the measurement reporting as well as the handover and radio link failure handling at the UE.

FIG. 21 illustrates the UE behavior according to a further exemplary implementation, which additionally comprises how to handle handover and radio link failure. FIG. 21 is an extension of the UE behavior illustrated in and explained based on FIG. 15. It further includes a determination as to whether a handover command is received from the serving base station of the UE. The handover command message is transmitted by the serving base station to initiate a handover from the serving radio cell to another target cell. The UE, when receiving such a handover command message, continues to handover to the other cell. If the handover fails, the UE sends measurement results including the accuracy parameters to that cell, to which the UE performs a connection reestablishment. Otherwise, when the handover succeeds, the handover is thus complete.

In particular implementations, the above-described mechanisms and solutions for improving the measurement can be implemented into the existing and future 5G NR framework. For instance, the improved measurement procedure can be implemented into the RRM measurement model discussed above for the 5G NR communication system, particularly as the L1-Filtering and L3-Filtering discussed in connection with FIG. 3. In particular, the measurement power result $A^1$ and C is generated, as well as a new measurement accuracy parameter according to above suitable options 1 and 3. In addition or alternatively, the L3-filtering can then be still done in addition, e.g., to neutralize sudden changes, and thereby generate the information that is included into the measurement report transmitted to the serving base station of the UE. For instance, the L3-Filtering can also be applied to the new measurement accuracy parameter by averaging the current accuracy parameter and the previous accuracy parameter provided by L1-Filtering.

In addition or alternatively, the three measurement options (and their variants) can be applied to L3-filtering. For instance, the layer-1 filtering may not implement any of the above options, and thus there may be cases when the L1-filtering will not generate any output ($A^1$), because the output might not be considered accurate enough. Therefore, the L3-Filtering can interpret such absent output from L1-Filtering as some useful information.

In addition or alternatively, the reference signals to be used in such an exemplary 5G NR implementation can be e.g., the CSI-RS or the SSB signals.

Further Aspects

According to a first aspect, a user equipment is provided, which comprises a receiver that receives a plurality of reference signals. Processing circuitry of the UE performs power-related measurements on the plurality of reference signals. The processing circuitry determines the availability of reference signals among the plurality of reference signals for the power-related measurements. The processing circuitry generates measurement results based on the performed power-related measurements and depending on the determined availability of the reference signals.

According to a second aspect provided in addition to the first aspect, the processing circuitry, when determining the availability of the reference signals, determines the number of reference signals during a measurement time period that are not available while performing the power-related measurements. The processing circuitry, when generating the measurement results, determines a measurement accuracy parameter reflecting the measurement accuracy of the power-related measurements, based on the determined number of non-available reference signals. The processing circuitry, when generating the measurement results, includes the determined measurement accuracy parameter as part of the measurement results. In an optional implementation, the non-available reference signals include missing reference signals that are not received at all by the UE and un-qualified reference signals that are received by the UE but have a power below the power threshold. In a further optional implementation, the measurement accuracy parameter is a ratio between the determined number of non-available reference signals during the measurement time period and the total number of reference signals expected during the measurement time period.

According to a third aspect provided in addition to the first or second aspect, the processing circuitry, when determining the availability of the reference signals, determines a channel occupancy time period within a measurement time period during which signals from a source other than the source of the measured reference signals occupy a radio channel on which the measured reference signals are received. The processing circuitry, when generating the measurement results, determines a measurement accuracy parameter reflecting the measurement accuracy of the power-related measurements based on the determined channel occupancy time period. The processing circuitry, when generating the measurement results, includes the determined measurement accuracy parameter as part of the measurement results. In an optional implementation, the measurement accuracy parameter is a ratio between the determined channel occupancy time period and the measurement time period. In an optional implementation, determining the channel occupancy time period includes:

determining a first time period during which signals are received by the UE that can be decoded by the UE and are from a source other than the source of the measured reference signals, the source being identifiable by the UE based on the decoded signal, and determining a second time period during which signals are received by the UE that cannot be decoded by the UE and are above a power threshold, determining the channel occupancy time period as the sum of the first and second time periods.

According to a fourth aspect provided in addition to any of first to third aspects, the processing circuitry, when determining the availability of the reference signals, determines those reference signals during a measurement time period that are not available while performing the power-related measurements. The processing circuitry generates the measurement results also based on the non-available reference signals. In an optional implementation, the non-available reference signals are the missing reference signals that are not received at all by the UE. In an optional implementation, any non-available reference signal is considered for the power-related measurements as having been received with a certain power, optionally wherein the certain power considered for a non-available reference signal is one of zero power, a low positive power, and a low negative power.

According to a fifth aspect provided in addition to any of the first to fourth aspects, the processing circuitry determines whether the power-related measurements on the reference signals are performed on a serving frequency of a serving radio cell to which the UE is connected or on another frequency different from the serving frequency of the serving radio cell. The processing circuitry operates according to one of the above second, third or fourth aspects depending on whether the power-related measurements on the reference signals are performed on the serving frequency or on another frequency. In an optional implementation, in case the power-related measurements on the reference signals are performed on the serving frequency, the processing circuitry operates according to the above second, third or further aspect. In case the power-related measurements on the reference signals are performed one another frequency, the processing circuitry operates according to the above second or fourth aspect.

According to a sixth aspect provided in addition to any of the first to fifth aspects, the processing circuitry generates a measurement report based on the power-related measurements, including the measurement results. A transmitter of the UE transmits the generated measurement report to a serving base station to which the UE is connected. In an optional implementation, the processing circuitry performs the power-related measurements and generates the measurement results for a plurality of radio cells and wherein the measurement report comprises the generated measurement results for the plurality of radio cells.

According to a seventh aspect provided in addition to any of the second to sixth aspects, the processing circuitry determines a measurement accuracy decision as to whether the measurement is accurate or not based on the determined measurement accuracy parameter. In an optional implementation the processing circuitry, when determining the measurement accuracy decision, compares the determined measurement accuracy parameter against an accuracy threshold, optionally wherein the accuracy threshold is configured by a serving base station to which the UE is connected. In a further optional implementation the processing circuitry generates a measurement report based on the power-related measurements, including the measurement results and the measurement accuracy decision, and a transmitter of the UE transmits the generated measurement report to a serving base station to which the UE is connected.

According to an eighth aspect provided in addition to any of the second to seventh aspects, a set of measurement reporting conditions are defined for controlling reporting of the measurement results to a serving base station to which the UE is connected, including at least one of an entering condition for starting the reporting of the measurement results, a leaving condition for stopping the reporting of the measurement results, and a time condition within which the leaving condition or entering condition has to be fulfilled. At least some of the measurement reporting conditions depend on the determined measurement accuracy parameter. In an optional implementation, one additional entering condition is that the accuracy of the measurement is high enough. Optionally, when the measurement accuracy parameter is above a threshold, wherein the additional entering condition is to be fulfilled in addition to another entering condition. Optionally, one additional leaving condition is that the accuracy of the measurement accuracy is too low, optionally when the measurement accuracy parameter is below a threshold.

According to a ninth aspect provided in addition to any of the second to eighth aspects, the UE during a handover from a serving radio cell to which the UE is connected to another radio cell experiences a radio link failure. A transmitter of the UE transmits information on the radio link failure to a base station to which the UE is connected after experiencing the radio link failure, the radio link failure information including the measurement accuracy parameter.

According to a tenth aspect provided in addition to any of the first to ninth aspects, the power-related measurements are performed on an unlicensed radio frequency. In an optional implementation, the measurement results include measurement values reflecting the power of the reference signals during a measurement time period. Optionally, each of the measurement values is an average of the powers of the reference signals during a measurement time period.

According to an eleventh aspect provided in addition to any one of the first to tenth aspects, the plurality of reference signals is transmitted from a serving base station to which the UE is connected or from a neighbor base station which neighbors the serving base station. In an optional implementation the reference signals are channel state information reference signals, CSI-RS, and/or synchronization signal block, SSB, reference signals, according to a 3GPP 5th generation new radio communication system, optionally wherein the SSB reference signals includes a Primary Synchronization Signal, PSS; a Secondary Synchronization Signal, SSS; and a Physical Broadcast CHannel, PBCH.

According to a twelfth aspect, a base station is provided comprising a transmitter that transmits a plurality of reference signals in a radio cell controlled by the base station. A receiver of the base station receives measurement results from a user equipment, UE, based on power-related measurement performed by the user equipment on the reference signals. The measurement results include measurement values reflecting the power of the reference signals during a measurement time period. The measurement results include a measurement accuracy parameter reflecting the measurement accuracy of the power-related measurements. Processing circuitry of the base station determines whether to handover the user equipment from the radio cell to another radio cell, based on the received measurement values and measurement accuracy parameter of the measurement results.

According to a thirteenth aspect provided in addition to the twelfth aspect, the transmitter, when in operation, transmits a measurement configuration information to the user equipment, including a power value to be used by the user equipment when performing power-related measurements, the power value being considered by the UE for a non-available reference signal when generating the measurements is also based on the non-available reference signals. The non-available reference signal is a reference signal that is not available during the measurement time period while performing the power-related measurements. Optionally wherein the certain power considered for a non-available reference signal is one of zero power, a low positive power and a low negative power.

According to a fourteenth aspect, provided in addition to the twelfth or thirteenth aspect, the receiver receives from the user equipment information on a radio link failure experienced by the user equipment during a handover of the user equipment. The radio link failure information includes the measurement accuracy parameter. Optionally, the processing circuitry determines adapted parameters of a measurement configuration information for controlling reporting of the measurement results from the UE to the base station based on the received radio link failure information, including at least one of an entering condition for starting the reporting of the measurement results, a leaving condition for stopping the reporting of the measurement results, and a time condition within which the leaving condition or entering condition has to be fulfilled.

According to a fifteenth aspect, a method is provided including the following steps performed by a user equipment. The UE receives a plurality of reference signals, The UE performs power-related measurements on the plurality of reference signals. The UE determines the availability of reference signals among the plurality of reference signals for the power-related measurements. The UE generates measurement results based on the performed power-related measurements and depending on the determined availability of the reference signals.

Hardware and Software Implementation of the Present Disclosure

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC (integrated circuit), a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred as a communication apparatus.

Some non-limiting examples of such communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things" (IoT).

The communication may include exchanging data through, for example, a cellular system, a wireless LAN system, a satellite system, etc., and various combinations thereof.

The communication apparatus may comprise a device such as a controller or a sensor, which is coupled to a communication device performing a function of communication described in the present disclosure. For example, the communication apparatus may comprise a controller or a sensor that generates control signals or data signals, which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

Further, the various embodiments may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc. It should be further noted that the individual features of the different embodiments may individually or in arbitrary combination be subject matter to another embodiment.

It would be appreciated by a person skilled in the art that numerous variations and/or modifications may be made to the present disclosure as shown in the specific embodiments. The present embodiments are, therefore, to be considered in all respects to be illustrative and not restrictive.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A user equipment, UE, comprising:
a receiver, which in operation, receives a plurality of reference signals;

processing circuitry, which in operation, performs power-related measurements on the plurality of reference signals;

the processing circuitry, when in operation, determines the availability of reference signals among the plurality of reference signals for the power-related measurements and determines the number of reference signals during a measurement time period that are not available while performing the power-related measurements; and the processing circuitry, when in operation, determines a measurement accuracy parameter reflecting the measurement accuracy of the power-related measurements, based on the determined number of non-available reference signals, and generates measurement results including the determined measurement accuracy parameter based on the performed power-related measurements and depending on the determined availability of the reference signals, wherein the non-available reference signals include missing reference signals that are not received at all by the UE and un-qualified reference signals that are received by the UE but have a power below a power threshold; and the measurement accuracy parameter is a ratio between the determined number of non-available reference signals during the measurement time period and the total number of reference signals expected during the measurement time period.

2. The user equipment according to claim 1, wherein the processing circuitry, when determining the availability of the reference signals, determines a channel occupancy time period within a measurement time period during which signals from a source other than the source of the measured reference signals occupy a radio channel on which the measured reference signals are received, wherein:

the processing circuitry, when generating the measurement results, determines a second measurement accuracy parameter reflecting the measurement accuracy of the power-related measurements based on the determined channel occupancy time period;

the processing circuitry, when generating the measurement results, includes the determined second measurement accuracy parameter as part of the measurement results;

the second measurement accuracy parameter is a ratio between the determined channel occupancy time period and the measurement time period; and determining the channel occupancy time period includes:
  determining a first time period during which signals are received by the UE that can be decoded by the UE and are from a source other than the source of the measured reference signals, the source being identifiable by the UE based on the decoded signal;
  determining a second time period during which signals are received by the UE that cannot be decoded by the UE and are above a power threshold; and
  determining the channel occupancy time period as the sum of the first and second time periods.

3. The user equipment according to claim 1, wherein
the non-available reference signals are the missing reference signals that are not received at all by the UE; and
any non-available reference signal is considered for the power-related measurements as having been received with a certain power, wherein the certain power considered for a non-available reference signal is one of zero power, a low positive power, and a low negative power.

4. The user equipment according to claim 1, wherein the processing circuitry, when in operation, determines whether the power-related measurements on the reference signals are performed on a serving frequency of a serving radio cell to which the UE is connected or on another frequency different from the serving frequency of the serving radio cell, wherein:

the processing circuitry operates depending on whether the power-related measurements on the reference signals are performed on the serving frequency or on another frequency.

5. The user equipment according to claim 1, wherein
the processing circuitry, when in operation, generates a measurement report based on the power-related measurements, including the measurement results; and
the UE comprises a transmitter, which in operation, transmits the generated measurement report to a serving base station to which the UE is connected,
wherein the processing circuitry, when in operation, performs the power-related measurements and generates the measurement results for a plurality of radio cells and wherein the measurement report comprises the generated measurement results for the plurality of radio cells.

6. The user equipment according to claim 1, wherein the processing circuitry, when in operation, determines a measurement accuracy decision as to whether the measurement is accurate or not based on the determined measurement accuracy parameter, wherein:

the processing circuitry, when determining the measurement accuracy decision, compares the determined measurement accuracy parameter against an accuracy threshold, wherein the accuracy threshold is configured by a serving base station to which the UE is connected; and the processing circuitry, when in operation, generates a measurement report based on the power-related measurements, including the measurement results and the measurement accuracy decision, and wherein the UE comprises a transmitter, which in operation, transmits the generated measurement report to the serving base station to which the UE is connected.

7. The user equipment according to claim 1, wherein a set of measurement reporting conditions are defined for controlling reporting of the measurement results to a serving base station to which the UE is connected, including at least one of an entering condition for starting the reporting of the measurement results, a leaving condition for stopping the reporting of the measurement results, and a time condition within which the leaving condition or entering condition has to be fulfilled, wherein:

at least some of the measurement reporting conditions depend on the determined measurement accuracy parameter;

one additional entering condition is that the accuracy of the measurement is high enough, when the measurement accuracy parameter is above a threshold, wherein the additional entering condition is to be fulfilled in addition to another entering condition; and one additional leaving condition is that the accuracy of the measurement accuracy is too low, when the measurement accuracy parameter is below a threshold.

8. The user equipment according to claim 1, wherein the UE during a handover from a serving radio cell to which the UE is connected to another radio cell may experience a radio link failure, wherein the UE comprises a transmitter, which in operation, transmits information on the radio link failure to a base station to which the UE is connected after experiencing the radio link failure, the radio link failure information including the measurement accuracy parameter.

9. The user equipment according to claim 1, wherein the power-related measurements are performed on an unlicensed radio frequency,
wherein the measurement results include measurement values reflecting the power of the reference signals during the measurement time period, wherein each of the measurement values is an average of the powers of the reference signals during the measurement time period.

10. The user equipment according to claim 1, wherein the plurality of reference signals is transmitted from a serving base station to which the UE is connected or from a neighbor base station which neighbors the serving base station,
wherein the reference signals are channel state information reference signals, CSI-RS, and/or synchronization signal block, SSB, reference signals, according to a 3GPP 5$^{th}$ generation new radio communication system, wherein the SSB reference signals include a Primary Synchronization Signal, PSS; a Secondary Synchronization Signal, SSS; and a Physical Broadcast CHannel, PBCH.

11. A base station, comprising:
a transmitter, which in operation, transmits a plurality of reference signals in a radio cell controlled by the base station;
a receiver, which in operation, receives measurement results from a user equipment, UE, based on power-related measurements performed by the user equipment on the reference signals, the measurement results including measurement values reflecting the power of the reference signals during a measurement time period, and the measurement results including a measurement accuracy parameter that is based on the number of reference signals during a measurement time period that are not available while the UE performs the power-related measurements and that reflects the measurement accuracy of the power-related measurements; and
processing circuitry, which in operation, determines whether to handover the user equipment from the radio cell to another radio cell, based on the received measurement values and measurement accuracy parameter of the measurement results,
wherein
the non-available reference signals include missing reference signals that are not received at all by the UE and un-qualified reference signals that are received by the UE but have a power below a power threshold; and
the measurement accuracy parameter is a ratio between the determined number of non-available reference signals during the measurement time period and the total number of reference signals expected during the measurement time period.

12. The base station according to claim 11, wherein the transmitter, when in operation, transmits a measurement configuration information to the user equipment, including a power value to be used by the user equipment when performing power-related measurements, the power value being considered by the UE for a non-available reference signal when generating the measurements based on the non-available reference signals, wherein the non-available reference signal is a reference signal that is not available during the measurement time period while performing the power-related measurements,
wherein the power value considered for a non-available reference signal is one of zero power, a low positive power, and a low negative power.

13. The base station according to claim 11, wherein the receiver, when in operation, receives from the user equipment information on a radio link failure experienced by the user equipment during a handover of the user equipment, the radio link failure information including the measurement accuracy parameter,
wherein the processing circuitry, when in operation, determines adapted parameters of a measurement configuration information for controlling reporting of the measurement results from the UE to the base station based on the received radio link failure information, including at least one of an entering condition for starting the reporting of the measurement results, a leaving condition for stopping the reporting of the measurement results, and a time condition within which the leaving condition or entering condition has to be fulfilled.

14. A method performed by a user equipment, the method comprising:
receiving a plurality of reference signals;
performing power-related measurements on the plurality of reference signals;
determining the availability of reference signals among the plurality of reference signals for the power-related measurements and determining the number of reference signals during a measurement time period that are not available while performing the power-related measurements; and
determining a measurement accuracy parameter reflecting the measurement accuracy of the power-related measurements, based on the determined number of non-available reference signals, and generating measurement results including the determined measurement accuracy parameter based on the performed power-related measurements and depending on the determined availability of the reference signals,
wherein
the non-available reference signals include missing reference signals that are not received at all by the UE and un-qualified reference signals that are received by the UE but have a power below a power threshold; and
the measurement accuracy parameter is a ratio between the determined number of non-available reference signals during the measurement time period and the total number of reference signals expected during the measurement time period.

* * * * *